US008320302B2

(12) United States Patent
Richeson et al.

(10) Patent No.: US 8,320,302 B2
(45) Date of Patent: Nov. 27, 2012

(54) OVER THE AIR MICROCONTROLLER FLASH MEMORY UPDATES

(75) Inventors: Keith D. Richeson, Cary, NC (US); David Uy, Raleigh, NC (US); Andrew J. Borleske, Garner, NC (US); Brent R. Brian, Clayton, NC (US); Robert T. Mason, Jr., Raleigh, NC (US); Rodney C. Hemminger, Raleigh, NC (US); Russell G. Christopher, Clayton, NC (US); Raymond Kelley, Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 1153 days.

(21) Appl. No.: 11/738,226

(22) Filed: Apr. 20, 2007

(65) Prior Publication Data

US 2008/0259844 A1  Oct. 23, 2008

(51) Int. Cl.
*H04W 4/00* (2009.01)
(52) U.S. Cl. ............. 370/328; 713/1; 713/100; 711/103
(58) Field of Classification Search .................. 370/328; 713/1, 100; 711/103
See application file for complete search history.

(56) References Cited

U.S. PATENT DOCUMENTS

| 3,455,815 | A | 5/1969 | Saltzberg et al. ............. 340/163 |
| 3,858,212 | A | 12/1974 | Tompkins et al. ...... 343/100 CS |
| 3,878,512 | A | 4/1975 | Kobayashi et al. ........ 340/168 R |
| 3,973,240 | A | 8/1976 | Fong ............................ 340/151 |
| 4,031,513 | A | 6/1977 | Simciak ..................... 340/152 T |
| 4,056,107 | A | 11/1977 | Todd et al. ........................ 130/27 |
| 4,066,964 | A | 1/1978 | Costanza et al. ................. 325/55 |
| 4,132,981 | A | 1/1979 | White ............................. 340/203 |
| 4,190,800 | A | 2/1980 | Kelly, Jr. et al. ................ 325/37 |
| 4,204,195 | A | 5/1980 | Bogacki ........................ 340/151 |
| 4,218,737 | A | 8/1980 | Buscher et al. ............... 364/493 |
| 4,250,489 | A | 2/1981 | Dudash et al. ................ 340/147 |

(Continued)

FOREIGN PATENT DOCUMENTS

CH          682196 A5         7/1993

(Continued)

OTHER PUBLICATIONS

Desbonnet, Joe et al., "System Architecture and Implementation of CEBus/Internet Gateway", *IEEE*, 1997, 1057-1062.

(Continued)

*Primary Examiner* — Rafael Pérez-Gutiérrez
*Assistant Examiner* — Liton Miah
(74) *Attorney, Agent, or Firm* — Woodcock Washburn LLP

(57) ABSTRACT

Techniques for over the air (OTA) microcontroller flash memory updates using a wireless network are disclosed herein. A control node first transmits the microcontroller flash memory update to all devices that can receive the message. Each packet of the message is relayed through multiple communication levels until all devices receive the packet. This starts with communications from the control node to each device node that has a direct communication path to the control node, which are referred to herein as "first level" device nodes. The first level device nodes then relay each communication to each other device node that has a direct communication path to the first level device nodes, which are referred to herein as "second level" device nodes. This process is repeated at each level of the wireless network until each of the plurality of device nodes has received the microcontroller flash memory update.

17 Claims, 7 Drawing Sheets

U.S. PATENT DOCUMENTS

| | | | |
|---|---|---|---|
| 4,254,472 A | 3/1981 | Juengel et al. | 364/900 |
| 4,319,358 A | 3/1982 | Sepp | 375/1 |
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,804,957 A | 2/1989 | Selph et al. | 340/870.03 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |
| 5,488,608 A | 1/1996 | Flammer, III | 370/85.13 |
| 5,491,473 A | 2/1996 | Gilbert | 340/870.01 |
| 5,493,287 A | 2/1996 | Ane | 340/825.52 |
| 5,495,239 A | 2/1996 | Ouellette | 340/870.02 |
| 5,497,424 A | 3/1996 | Vanderpool | 380/34 |
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |

| | | | | | | | |
|---|---|---|---|---|---|---|---|
| 5,521,910 A | 5/1996 | Matthews | 370/54 | 5,910,799 A | 6/1999 | Carpenter et al. | 345/333 |
| 5,522,044 A | 5/1996 | Pascucci et al. | 395/200.06 | 5,923,269 A | 7/1999 | Shuey et al. | 340/870.02 |
| 5,524,280 A | 6/1996 | Douthitt et al. | 455/62 | 5,926,103 A | 7/1999 | Petite | 340/825.19 |
| 5,525,898 A | 6/1996 | Lee, Jr. et al. | 324/142 | 5,926,531 A | 7/1999 | Petite | 379/144 |
| 5,526,389 A | 6/1996 | Buell et al. | 375/200 | 5,943,375 A | 8/1999 | Veintimilla | 375/355 |
| 5,528,507 A | 6/1996 | McNamara et al. | 364/483 | 5,944,842 A | 8/1999 | Propp et al. | 714/701 |
| 5,528,597 A | 6/1996 | Gerszberg et al. | 370/95.3 | 5,953,319 A | 9/1999 | Dutta et al. | 370/238 |
| 5,539,775 A | 7/1996 | Tuttle et al. | 375/200 | 5,958,018 A | 9/1999 | Eng et al. | |
| 5,541,589 A | 7/1996 | Delaney | 340/870.02 | 5,959,550 A | 9/1999 | Giles | 340/870.02 |
| 5,544,036 A | 8/1996 | Brown, Jr. et al. | 364/145 | 5,960,074 A | 9/1999 | Clark | 379/310 |
| 5,546,424 A | 8/1996 | Miyake | 375/206 | 5,963,146 A | 10/1999 | Johnson et al. | 340/870.1 |
| 5,548,527 A | 8/1996 | Hemminger et al. | 364/492 | 5,974,236 A | 10/1999 | Sherman | 395/200.51 |
| 5,548,633 A | 8/1996 | Kujawa et al. | 379/93 | 5,986,574 A | 11/1999 | Colton | 340/870.02 |
| 5,553,094 A | 9/1996 | Johnson et al. | 375/200 | 6,000,034 A | 12/1999 | Lightbody et al. | 713/202 |
| 5,555,508 A | 9/1996 | Munday et al. | 364/492 | 6,028,522 A | 2/2000 | Petite | 340/641 |
| 5,559,870 A | 9/1996 | Patton et al. | 379/107 | 6,034,988 A | 3/2000 | VanderMey et al. | 375/202 |
| 5,566,332 A | 10/1996 | Adair et al. | 395/600 | 6,035,201 A | 3/2000 | Whitehead | 455/455 |
| 5,570,084 A | 10/1996 | Ritter et al. | 340/825.05 | 6,041,056 A | 3/2000 | Bigham et al. | 370/395 |
| 5,572,438 A | 11/1996 | Ehlers et al. | 364/492 | 6,041,506 A | 3/2000 | Iwao | 370/395 |
| 5,574,657 A | 11/1996 | Tofte | 364/510 | 6,061,604 A | 5/2000 | Russ et al. | 700/90 |
| 5,590,179 A | 12/1996 | Shincovich et al. | 379/107 | 6,067,029 A | 5/2000 | Durston | 340/870.03 |
| 5,592,470 A | 1/1997 | Rudrapatna et al. | 370/320 | 6,073,169 A | 6/2000 | Shuey et al. | 709/217 |
| 5,594,740 A | 1/1997 | LaDue | 379/59 | 6,073,174 A | 6/2000 | Montgomerie et al. | 709/224 |
| 5,602,744 A | 2/1997 | Meek et al. | 364/464.22 | 6,078,251 A | 6/2000 | Landt et al. | 340/10.41 |
| 5,617,084 A | 4/1997 | Sears | 331/176 | 6,078,909 A | 6/2000 | Knutson | 705/59 |
| 5,619,192 A | 4/1997 | Ayala | 340/870.02 | 6,088,659 A | 7/2000 | Kelley et al. | 702/62 |
| 5,619,685 A | 4/1997 | Schiavone | 395/500 | 6,091,758 A | 7/2000 | Ciccone et al. | 375/132 |
| 5,621,629 A | 4/1997 | Hemminger et al. | 363/56 | 6,100,817 A | 8/2000 | Mason, Jr. et al. | 340/870.02 |
| 5,627,759 A | 5/1997 | Bearden et al. | 364/483 | 6,112,192 A | 8/2000 | Capek | 705/59 |
| 5,631,636 A | 5/1997 | Bane | 340/825.69 | 6,124,806 A | 9/2000 | Cunningham et al. | 340/870.02 |
| 5,636,216 A | 6/1997 | Fox et al. | 370/402 | 6,128,276 A | 10/2000 | Agee | 370/288 |
| 5,640,679 A | 6/1997 | Lundqvist et al. | 455/33.2 | 6,137,423 A | 10/2000 | Glorioso et al. | 340/870.02 |
| 5,659,300 A | 8/1997 | Dresselhuys et al. | 340/870.02 | 6,150,955 A | 11/2000 | Tracy et al. | 340/870.02 |
| 5,668,803 A | 9/1997 | Tymes et al. | 370/347 | 6,154,487 A | 11/2000 | Murai et al. | 375/150 |
| 5,668,828 A | 9/1997 | Sanderford, Jr. et al. | 375/202 | 6,160,993 A | 12/2000 | Wilson | 455/12.1 |
| 5,673,252 A | 9/1997 | Johnson et al. | 370/449 | 6,172,616 B1 | 1/2001 | Johnson et al. | 340/870.12 |
| 5,684,472 A | 11/1997 | Bane | 340/870.02 | 6,195,018 B1 | 2/2001 | Ragle et al. | 340/870.01 |
| 5,684,799 A | 11/1997 | Bigham et al. | 370/397 | 6,199,068 B1 | 3/2001 | Carpenter | 707/100 |
| 5,691,715 A | 11/1997 | Ouellette | 340/870.09 | 6,208,266 B1 | 3/2001 | Lyons et al. | 340/870.02 |
| 5,692,180 A | 11/1997 | Lee | 395/610 | 6,214,806 B1 | 4/2001 | Krieg et al. | 514/44 |
| 5,696,501 A | 12/1997 | Ouellette et al. | 340/870.02 | 6,218,953 B1 | 4/2001 | Petite | 340/641 |
| 5,696,765 A | 12/1997 | Safadi | 370/436 | 6,233,327 B1 | 5/2001 | Petite | 379/155 |
| 5,699,276 A | 12/1997 | Roos | 364/514 A | 6,246,677 B1 | 6/2001 | Nap et al. | 370/346 |
| 5,714,931 A | 2/1998 | Petite et al. | 340/539 | 6,249,516 B1 | 6/2001 | Brownrigg et al. | 370/338 |
| 5,715,390 A | 2/1998 | Hoffman et al. | 395/188.01 | 6,333,975 B1 | 12/2001 | Brunn et al. | 379/106.03 |
| 5,717,604 A | 2/1998 | Wiggins | 364/514 C | 6,363,057 B1 | 3/2002 | Ardalan et al. | 370/252 |
| 5,719,564 A | 2/1998 | Sears | 340/870.02 | 6,373,399 B1 | 4/2002 | Johnson et al. | 340/870.11 |
| 5,745,027 A | 4/1998 | Entner et al. | 707/103 | 6,393,341 B1 | 5/2002 | Lawrence et al. | 700/286 |
| 5,748,104 A | 5/1998 | Argyroudis et al. | 340/870.11 | 6,396,839 B1 | 5/2002 | Ardalan et al. | 370/401 |
| 5,748,619 A | 5/1998 | Meier | 370/278 | 6,421,731 B1 | 7/2002 | Ciotti, Jr. et al. | 709/238 |
| 5,751,914 A | 5/1998 | Coley et al. | 395/51 | 6,430,268 B1 | 8/2002 | Petite | 379/39 |
| 5,751,961 A | 5/1998 | Smyk | 395/200.47 | 6,437,692 B1 | 8/2002 | Petite et al. | 340/540 |
| 5,754,772 A | 5/1998 | Leaf | 395/200.33 | 6,446,192 B1 | 9/2002 | Narasimhan et al. | 712/29 |
| 5,754,830 A | 5/1998 | Butts et al. | 395/500 | 6,643,278 B1 | 11/2003 | Panasik et al. | 370/330 |
| 5,757,783 A | 5/1998 | Eng et al. | 370/315 | 6,657,549 B1 | 12/2003 | Avery | 340/825.49 |
| 5,768,148 A | 6/1998 | Murphy et al. | 364/492 | 6,684,245 B1 | 1/2004 | Shuey et al. | 709/223 |
| 5,778,368 A | 7/1998 | Hogan et al. | 707/10 | 6,751,563 B2 | 6/2004 | Spanier et al. | 702/61 |
| 5,787,437 A | 7/1998 | Potterveld et al. | 707/103 | 6,867,707 B1 | 3/2005 | Kelley et al. | 370/870.2 |
| 5,790,789 A | 8/1998 | Suarez | 395/200.32 | 6,980,537 B1 * | 12/2005 | Liu | 370/338 |
| 5,790,809 A | 8/1998 | Holmes | 395/200.58 | 7,698,698 B2 * | 4/2010 | Skan | 717/168 |
| 5,801,643 A | 9/1998 | Williams et al. | 340/870.02 | 7,810,088 B2 * | 10/2010 | Herle et al. | 717/173 |
| 5,805,712 A | 9/1998 | Davis | 380/50 | 2001/0002210 A1 | 5/2001 | Petite | 379/155 |
| 5,808,558 A | 9/1998 | Meek et al. | 340/870.01 | 2001/0024163 A1 | 9/2001 | Petite | 340/628 |
| 5,809,059 A | 9/1998 | Souissi et al. | 375/202 | 2002/0012323 A1 | 1/2002 | Petite | 370/252 |
| 5,822,521 A | 10/1998 | Gartner et al. | 395/200.6 | 2002/0013679 A1 | 1/2002 | Petite | 702/188 |
| 5,850,187 A | 12/1998 | Carrender et al. | 340/10.42 | 2002/0019712 A1 | 2/2002 | Petite et al. | 702/61 |
| 5,862,391 A | 1/1999 | Salas et al. | 395/750.01 | 2002/0019725 A1 | 2/2002 | Petite | 702/188 |
| 5,864,757 A | 1/1999 | Parker | | 2002/0026957 A1 | 3/2002 | Reyman | 137/39 |
| 5,872,774 A | 2/1999 | Wheatley, III et al. | 370/335 | 2002/0027504 A1 | 3/2002 | Davis et al. | 340/540 |
| 5,874,903 A | 2/1999 | Shuey et al. | 340/870.02 | 2002/0031101 A1 | 3/2002 | Petite et al. | 370/310 |
| 5,875,183 A | 2/1999 | Nitadori | 370/328 | 2002/0094799 A1 | 7/2002 | Elliott et al. | 455/405 |
| 5,875,402 A | 2/1999 | Yamawaki | 455/502 | 2002/0125998 A1 | 9/2002 | Petite et al. | 340/286.01 |
| 5,884,184 A | 3/1999 | Sheffer | 455/521 | 2002/0145537 A1 | 10/2002 | Mueller et al. | 340/870.02 |
| 5,892,758 A | 4/1999 | Argyroudis | 370/335 | 2002/0169643 A1 | 11/2002 | Petite et al. | 705/5 |
| 5,896,382 A | 4/1999 | Davis et al. | 370/401 | 2002/0177910 A1 | 11/2002 | Quarterman et al. | |
| 5,897,607 A | 4/1999 | Jenney et al. | 702/62 | 2003/0036810 A1 | 2/2003 | Petite | 700/9 |
| 5,898,387 A | 4/1999 | Davis et al. | 340/870.02 | 2003/0036822 A1 | 2/2003 | Davis et al. | 700/295 |
| 5,907,491 A | 5/1999 | Canada et al. | 364/468.15 | 2003/0046396 A1 | 3/2003 | Richter et al. | |
| 5,907,540 A | 5/1999 | Hayashi | 370/315 | 2003/0123442 A1 | 7/2003 | Drucker et al. | 370/392 |

| | | | | |
|---|---|---|---|---|
| 2003/0202512 | A1 | 10/2003 | Kennedy | 370/389 |
| 2004/0001008 | A1 | 1/2004 | Shuey et al. | 340/870.02 |
| 2005/0168326 | A1* | 8/2005 | White et al. | 340/310.01 |
| 2005/0169056 | A1* | 8/2005 | Berkman et al. | 365/185.22 |
| 2005/0184881 | A1 | 8/2005 | Dusenberry et al. | 340/870.02 |
| 2005/0270173 | A1 | 12/2005 | Boaz | 340/870.02 |
| 2006/0071776 | A1* | 4/2006 | White et al. | 340/538 |
| 2006/0187866 | A1 | 8/2006 | Werb et al. | |
| 2007/0087756 | A1 | 4/2007 | Hoffberg | |
| 2010/0268867 | A1* | 10/2010 | Gyl et al. | 711/103 |

FOREIGN PATENT DOCUMENTS

| | | | |
|---|---|---|---|
| EP | 0 395 495 | A1 | 10/1990 |
| EP | 0 446 979 | A1 | 9/1991 |
| EP | 0 629 098 | A2 | 12/1994 |
| GB | 2 118 340 | A | 10/1983 |
| GB | 2 157 448 | A | 10/1985 |
| GB | 2 186 404 | A | 8/1987 |
| GB | 02 222 898 | A | 3/1990 |
| GB | 2 237 910 | A | 5/1991 |
| JP | 59-229949 | | 12/1984 |
| JP | 02-67967 | A | 3/1990 |
| JP | 4290593 | A | 10/1992 |
| JP | 05-260569 | | 10/1993 |
| JP | 8194023 | A | 7/1996 |
| WO | 93/02515 | A1 | 2/1993 |
| WO | 93/04451 | A1 | 3/1993 |
| WO | 95/32595 | A1 | 11/1995 |
| WO | 96/10856 | A1 | 4/1996 |
| WO | WO 98/27780 | A2 | 6/1998 |

OTHER PUBLICATIONS

Markwalter, Brian et al., "CEBus Network Layer Description", *IEEE*, 1989, 571-575.

Newtown, Harry, *Newton's Telecom Dictionary*, Flatiron Publishing, Inc., 10$^{th}$ Ed., 1996, LAN (1 of 1): Cebus Overview (1-3): Cebus Industry Council (1 of 1).

Newtown, Harry, *Newton's Telecom Dictionary*, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998: —MOBITEX®: The Heart of Every BellSouth Solution—MOBITEX Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions for Utility Customers. (No Date). (No Page Numbers or Pages).

Rappaport, T. S., "Wireless Communications, Principles and Practice," Prentice Hall PTR, 1996, pp. 410-413.

Brochure: TRF6900 Single-Chip RF Transceiver, Texas Instrument, 2001©.

Corcoran, P.M. et al., "CEBus Network Access via the World-Wide-Web", *International Conference on Consumer Electronics*, Jun. 5-7, 1996, 236-237.

Corcoran, P.M. et al., "Browser-Style Interfaces to a Home Automation Network", *IEEE Trans. On Consumer Electronics*, Nov. 1, 1997, 43(4), 1063-1069.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Jubin, J., "Current Packet Radio Networks Protocols", *IEEE Infocom Proceedings*, 1985, 86-92.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3.1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Wescott, J. et al., "A Distributed Routing Design for a Broadcast Environment", *EEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

Chlamtac, I. et al., "Optimizing the System of Virtual Paths", *IEEE ACM Transactions on Networking*, 1994, 2(6), 581-586.

Leung, V.C.M., "Internetworking Wireless Terminals to Local Area Networks Via Radio Bridges", *ICWC*, 1992, 126-129.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

\* cited by examiner

OVER THE AIR MICROCONTROLLER FLASH MEMORY UPDATES

BACKGROUND OF THE INVENTION

Automated systems exist for controlling and measuring usage of resources, such as gas, water and electricity. Such systems may include a number of different types of devices, which will collectively be referred to herein as "system devices." Such system devices may include, for example, meter devices (e.g., gas, water, electricity meters, etc.), premises devices (e.g., in-home displays, thermostats, load control devices, etc.), and various other devices (e.g., communications devices, etc.). Within these automated systems, a number of different infrastructures may be employed for communicating data to and from the system devices. For example, some automated systems communicate with the system devices using a fixed wireless network, that includes, for example, a control node in communication with a number of device nodes (i.e., system devices). At the device nodes, the wireless communications circuitry may be incorporated into the system devices themselves, such that each device node in the wireless network comprises a system device having wireless communication circuitry that enables the system device to communicate with the control node. The device nodes may either communicate directly with the control node, or indirectly though one or more intermediate device nodes serving as repeaters. Some networks operating in this manner are referred to as "mesh" networks.

The system devices are typically controlled by software running on an embedded microcontroller, which is often referred to as firmware. Historically, the microcontroller code generated from the firmware is either programmed into a one-time programmable part or is loaded into a "mask" read only memory ("ROM") part. In these cases, the firmware cannot be changed after it is initially loaded to the microcontroller. More recently, however, microcontrollers with flash memory have become more prevalent. Flash memory allows the microcontroller code to be changed multiple times, thereby allowing the firmware to be changed. For example, the firmware may be changed to add new features or to correct an anomaly in the existing firmware.

For system devices with flash memories, the microcontroller code is typically changed at the factory or on-site, in the field. These changes have typically been done via a direct hardware connection to the system device or via an optically isolated interface. The process of updating on-site system device flash memory by separately visiting each individual system device location involves considerable time, expense, and inconvenience. In many metering systems, a number of system devices may be located in disparate or inaccessible locations, thereby further complicating the on-site updating process. Moreover, another inefficiency of the on-site updating process is that it fails to leverage the advantages of system infrastructures, such as the wireless networks described above, which are commonly used to communicate with the system devices.

Thus, there is a need in the art for fast, efficient and cost effective techniques for updating system device microcontroller flash memories.

SUMMARY OF THE INVENTION

Techniques for over the air (OTA) microcontroller flash memory updates using a wireless network are disclosed herein. The wireless network may comprise a control node and a plurality of device nodes in wireless communication with the control node. Each of the device nodes may have a wireless communication path to the control node that is either a direct path or an indirect path through one or more intermediate device nodes serving as relays. Each device node may include a corresponding device comprising an embedded microcontroller with a flash memory.

To update the microcontroller flash memories at the device nodes, the control node transmits a microcontroller flash memory update to the plurality of device nodes over the wireless network. In greater detail, the control node transmits each packet of the microcontroller flash memory update to each device node that has a direct communication path to the control node, which are referred to herein as "first level" device nodes. The first level device nodes then relay each packet of the microcontroller flash memory update to each other device node that has a direct communication path to the first level device nodes, which are referred to herein as "second level" device nodes. This process is repeated at each level of the wireless network until each of the plurality of device nodes has received the microcontroller flash memory update.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-7. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate. One or more devices, referred to herein as "collectors," are provided that "collect" data transmitted by the other meter devices so that it can be accessed by other computer systems. The collectors receive and compile metering data from a plurality of meter devices via wireless communications. A data collection server may communicate with the collectors to retrieve the compiled meter data.

Figure 1:
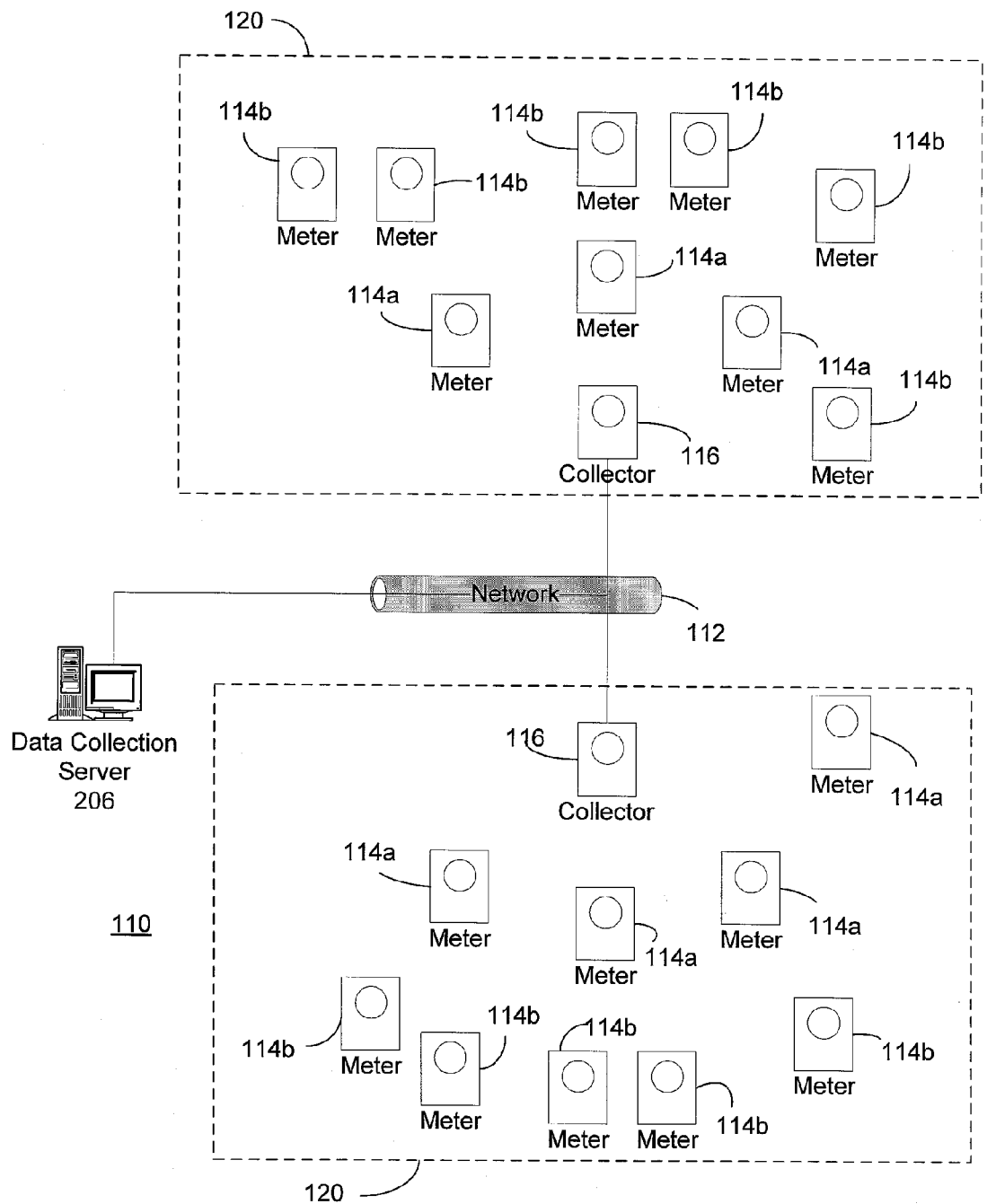
FIG. 1 is a diagram of an exemplary metering system.

FIG. 1 provides a diagram of one exemplary metering system 110. System 110 comprises a plurality of meters 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Electricity, LLC and marketed under the tradename REX.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) and direct sequence spread spectrum (DSSS).

A collector 116 and the meters 114 with which it communicates define a subnet/LAN 120 of system 110. As used herein, meters 114 and collectors 116 may be referred to as "nodes" in the subnet 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, or any combination of the above.

Although FIG. 1 shows a subnet/LAN 120 with a plurality of meters 114, the subnet/LAN 120 may also include a number of premises devices in communication with collector 116 such as, for example, in-home displays, thermostats, and load control devices. These devices are typically, although need not necessarily be, battery powered devices which operate in a sleep/wake cycle to conserve power. Because these devices typically operate in a sleep/wake cycle, they typically do not relay communications to any other device. Additionally, meters 114 may include various types of meters such as, for example, electricity, gas, and water meters. The electricity meters are typically line powered devices, while the gas and water meters are typically battery powered devices which also typically do not relay communications to any other device. The subnet/LAN 120 may also include, for example, various communications relay devices, which are typically line powered.

Figure 2:
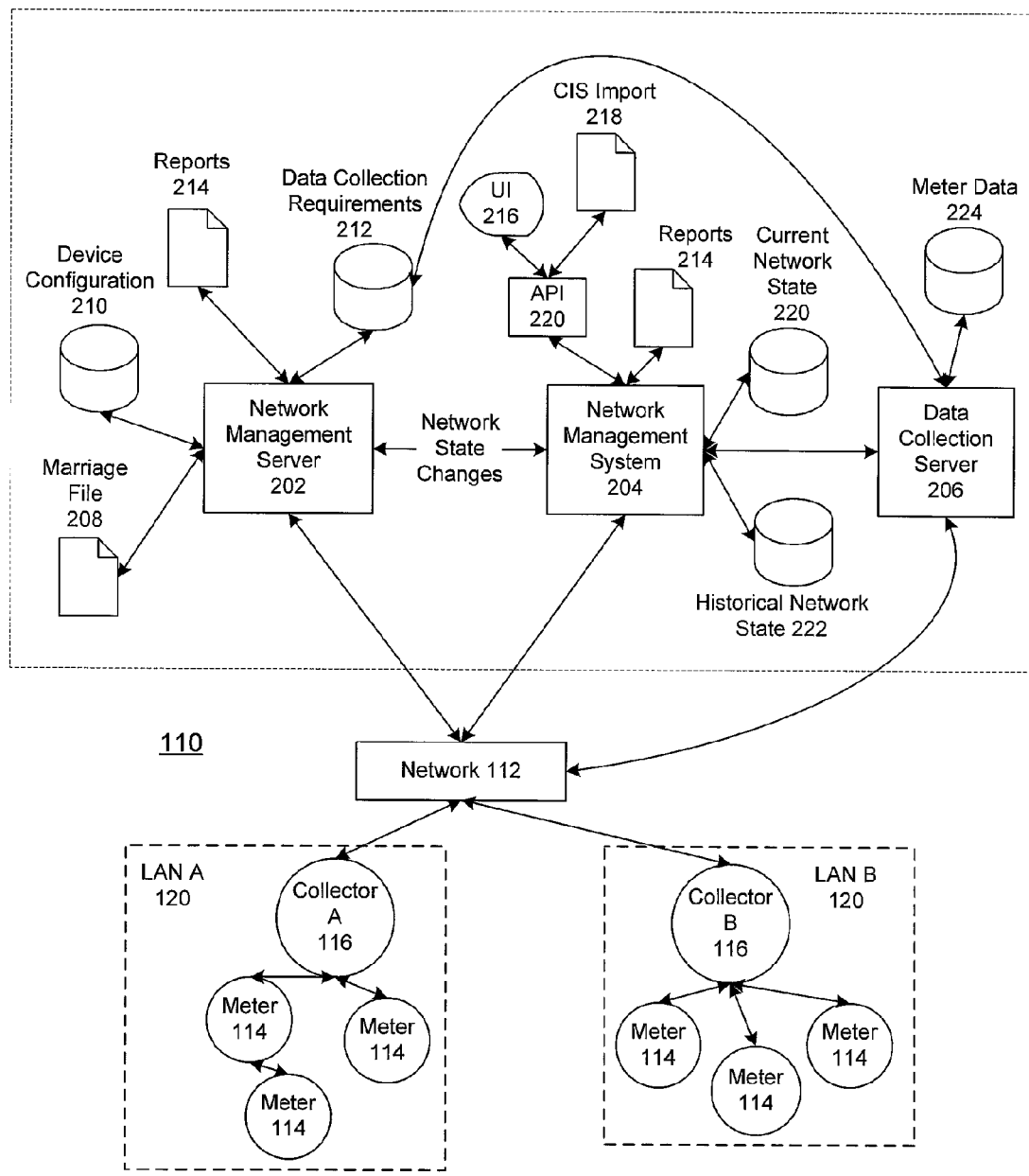
FIG. 2 expands upon the diagram of FIG. 1 and illustrates an exemplary metering system in greater detail.

Referring now to FIG. 2, further details of the metering system 110 are shown. Typically, the system will be operated by a utility company or a company providing information technology services to a utility company. As shown, the system 110 comprises a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 200, the device configuration database may include data regarding time of use (TOU) switchpoints, etc. for the meters 114 and collectors 116 communicating in the system 110. A data collection requirements database 212 contains information regarding the data to be collected on a per node basis. For example, a utility may specify that metering data such as load profile, demand, TOU, etc. is to be collected from particular meter(s) 114a. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224.

The data includes metering information, such as energy consumption and may be used for billing purposes, etc. by a utility provider.

The network management server 202, network management system 204 and data collection server 206 communicate with the nodes in each subnet/LAN 120 via network 110.

Figure 3:
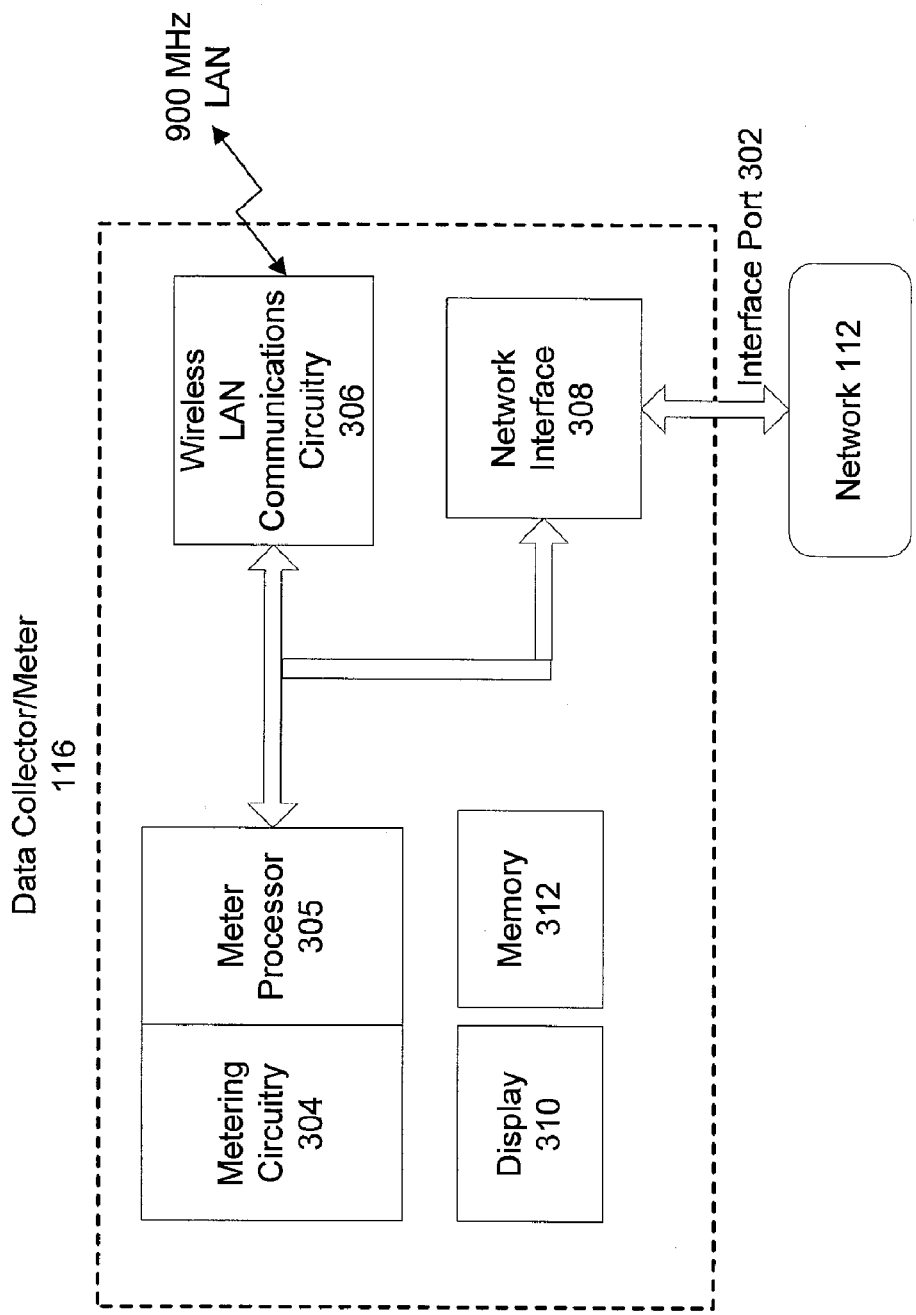
FIG. 3 is a block diagram illustrating an exemplary collector.

FIG. 3 is a block diagram illustrating further details of one embodiment of a collector 116. Although certain components are designated and discussed with reference to FIG. 3, it should be appreciated that the invention is not limited to such components. In fact, various other components typically found in an electronic meter may be a part of collector 116, but have not been shown in FIG. 3 for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 3, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In one embodiment, the metering circuitry 304, processor 305, display 310 and memory 312 are implemented using an A3 ALPHA meter available from Elster Electricity, Inc. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

The responsibility of a collector 116 is wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

An exemplary meter 114 may comprise metering circuitry for measuring the amount of a service or commodity that is consumed, a processor that controls the overall functions of the meter, a display for displaying meter data and status information, and a memory for storing data and program instructions. The meter 114 may further comprises wireless communications circuitry for transmitting and receiving data to/from other meters 114 or a collector 116.

Figure 4:
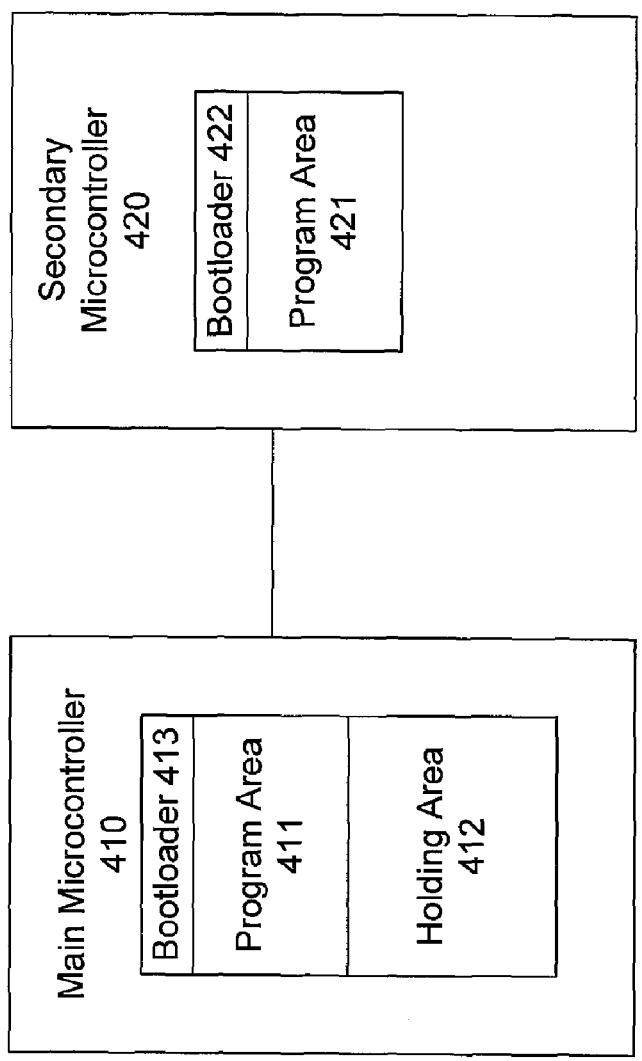
FIG. 4 is a block diagram illustrating an exemplary electricity meter flash microcontroller structure.

A block diagram illustrating an exemplary electricity meter flash microcontroller structure is shown in FIG. 4. The exemplary electricity meter flash microcontroller structure includes two microcontrollers, a main microcontroller 410 and a radio microcontroller 420, that communicate with each other through a serial interface (SPI bus). The main microcontroller 410 has a flash memory divided into a program area 411, a new image holding area 412, and a bootloader 413. The program area 411 may hold the microcontroller code that is being run to control the operation of the main microcontroller 410. The new image holding 412 area may used to hold new code for one of the following:

the main microcontroller 410 (to be loaded to the main micro program area 411)

the radio microcontroller 420 (to be transferred to the radio microcontroller 420 via the SPI bus, after the complete new image is received and verified)

A non-broadcast device, such as a gas or water meter, an in-home display, thermostat or load control device.

The bootloader area 413 may hold the microcontroller code that is run when a new flash image is to be transferred from the new image holding area 412 to the program area 411. The radio microcontroller 420 also includes a program area 421 and a bootloader 422.

Referring again to FIG. 1, in the exemplary embodiment shown, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a typically will only be in range to directly communicate with only a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 1, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 1024 meters might be registered with a single collector 116.

As mentioned above, each meter 114 and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated from the collector to each node. Each meter 114 therefore has a designated communications path to the collector that is either a direct path (e.g., all level one nodes) or an indirect path through one or more intermediate nodes that serve as repeaters.

Information is transmitted in this embodiment in the form of packets. For most network tasks such as, for example, reading meter data, collector 116 communicates with meters 114 in the subnet 120 using point-to-point transmissions. For example, a message or instruction from collector 116 is routed through the designated set of repeaters to the desired meter 114. Similarly, a meter 114 communicates with collector 116 through the same set of repeaters, but in reverse.

In some instances, however, collector 116 may need to quickly communicate information to all meters 114 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may re-broadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the communication server 122 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 communicates the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to data collection server 206, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 communicates the daily exceptions once every 24 hours.

In the present embodiment, a collector assigns designated communications paths to meters with bi-directional communication capability, and may change the communication paths for previously registered meters if conditions warrant. For example, when a collector 116 is initially brought into system 110, it needs to identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "node scan retry."

A full node scan may be performed, for example, when a collector is first installed. The collector 116 must identify and register nodes from which it will collect usage data. The collector 116 initiates a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (i.e., a measurement of the received radio signal strength) measured with respect to the received response from the meter to a selected threshold value. For example, the threshold value may be −60 dBm.

RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry includes the meter's LAN ID, its qualification score (e.g., 5 out of 10; or its RSSI value), its level (in this case level one) and the unique ID of its parent (in this case the collector's ID).

If the qualification threshold is met or exceeded, the collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 forwards to meter 114 an indication that it is registered, the unique identifier of the collector with which it is registered, the level the meter exists at in the subnet, and the unique identifier of its parent meter that will server as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process then continues by performing a similar process as that described above at each of the now registered level one nodes. This process results in the identification and registration of level two nodes. After the level two nodes are identified, a similar node scan process is performed at the level two nodes to identify level three nodes, and so on.

Specifically, to identify and register meters that will become level two meters, for each level one meter, in succession, the collector 116 transmits a command to the level one meter, which may be referred to as an "Initiate Node Scan Procedure" command. This command instructs the level one meter to perform its own node scan process. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Response request responds by performing a node scan process similar to that described above. More specifically, the meter broadcasts a request to which all unregistered nodes may respond.

The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request then waits for and receives responses from unregistered nodes. For each response, the meter stores in memory the unique identifier of the responding meter. This information is then transmitted to the collector.

For each unregistered meter that responded to the node scan issued by the level one meter, the collector attempts again to determine the reliability of the communication path to that meter. In one embodiment, the collector sends a "Qualify Nodes Procedure" command to the level one node which instructs the level one node to transmit a predetermined number of additional packets to the potential level two node and to record the number of acknowledgements received back from the potential level two node. This qualification score (e.g., 8 out of 10) is then transmitted back to the collector, which again compares the score to a qualification threshold. In other embodiments, other measures of the communications reliability may be provided, such as an RSSI value.

If the qualification threshold is not met, then the collector adds an entry for the node in the Straggler Table, as discussed above. However, if there already is an entry in the Straggler Table for the node, the collector will update that entry only if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information is updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the node scan response request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node that will serve as its parent, or repeater, when it communicates with the collector 116.

The collector then performs the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector will then send the Initiate Node Scan Response command to each level two node, in turn. Each level two node will then perform the same node scan procedure as performed by the level one nodes, potentially resulting in the registration of a number of level three nodes. The process is then performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop" only. For example, if an unregistered node responds to a node scan request from a level four node, and therefore, becomes a potential level five node, the qualification score for that node is based on the reliability of communications between the level four node and the potential level five node (i.e., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (i.e., level one nodes) or an indirect path through one or more intermediate nodes that serve as repeaters. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

The system 110 also automatically reconfigures to accommodate a new meter 114 that may be added. More particularly, the system identifies that the new meter has begun operating and identifies a path to a collector 116 that will become responsible for collecting the metering data. Specifically, the new meter will broadcast an indication that it is unregistered. In one embodiment, this broadcast might be, for example, embedded in, or relayed as part of a request for an update of the real time as described above. The broadcast will be received at one of the registered meters 114 in proximity to the meter that is attempting to register. The registered meter 114 forwards the time to the meter that is attempting to register. The registered node also transmits an exception request to its collector 116 requesting that the collector 116 implement a node scan, which presumably will locate and register the new meter. The collector 116 then transmits a request that the registered node perform a node scan. The registered node will perform the node scan, during which it requests that all unregistered nodes respond. Presumably, the newly added, unregistered meter will respond to the node scan. When it does, the collector will then attempt to qualify and then register the new node in the same manner as described above.

Once a communication path between the collector and a meter is established, the meter can begin transmitting its meter data to the collector and the collector can transmit data and instructions to the meter. As mentioned above, data is transmitted in packets. "Outbound" packets are packets transmitted from the collector to a meter at a given level. In one embodiment, outbound packets contain the following fields, but other fields may also be included:

Length—the length of the packet;
SrcAddr—source address—in this case, the ID of the collector;
DestAddr—the LAN ID of the meter to which the packet addressed;
RptPath—the communication path to the destination meter (i.e., the list of identifiers of each repeater in the path from the collector to the destination node); and
Data—the payload of the packet.

The packet may also include integrity check information (e.g., CRC), a pad to fill-out unused portions of the packet and other control information. When the packet is transmitted from the collector, it will only be forwarded on to the destination meter by those repeater meters whose identifiers appear in the RptPath field. Other meters that may receive the packet, but that are not listed in the path identified in the RptPath field will not repeat the packet.

"Inbound" packets are packets transmitted from a meter at a given level to the collector. In one embodiment, inbound packets contain the following fields, but other fields may also be included:

Length—the length of the packet;
SrcAddr—source address—the address of the meter that initiated the packet;
DestAddr—the ID of the collector to which the packet is to be transmitted;
RptAddr—the ID of the parent node that serves as the next repeater for the sending node;
Data—the payload of the packet;

Because each meter knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector. The node will then replace the RptAddr field with the identifier of its own parent and will then transmit the packet so that its parent will receive it. This process will continue through each repeater at each successive level until the packet reaches the collector.

For example, suppose a meter at level three initiates transmission of a packet destined for its collector. The level three node will insert in the RptAddr field of the inbound packet the identifier of the level two node that serves as a repeater for the level three node. The level three node will then transmit the packet. Several level two nodes may receive the packet, but only the level two node having an identifier that matches the identifier in the RptAddr field of the packet will acknowledge it. The other will discard it. When the level two node with the matching identifier receives the packet, it will replace the RptAddr field of the packet with the identifier of the level one packet that serves as a repeater for that level two packet, and the level two packet will then transmit the packet. This time, the level one node having the identifier that matches the RptAddr field will receive the packet. The level one node will insert the identifier of the collector in the RptAddr field and will transmit the packet. The collector will then receive the packet to complete the transmission.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 transmits a message to the meter 114 to respond to node scans going forward. The meter 114 remains registered but will respond to node scans in the same manner as an unregistered node as described above. In other embodiments, all registered meters may be permitted to respond to node scans, but a meter will only respond to a node scan if the path to the collector through the meter that issued the node scan is shorter (i.e., less hops) than the meter's current path to the collector. A lesser number of hops is assumed to provide a more reliable communication path than a longer path. A node scan request always identifies the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path will be rejected. However, if the RSSI threshold is met, the collector 116 will request that the node that issued the node scan perform the qualification process described above (i.e., send a predetermined number of packets to the node and count the number of acknowledgements received). If the resulting qualification score satisfies a threshold, then the collector will register the node with the new path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, only the qualification of the last "hop" (i.e., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If it is determined that the path to the new collector may be better than the path to its existing collector, the meter 114 responds to the node scan. Included in the response is information regarding any nodes for which the particular meter may operate as a repeater. For example, the response might identify the number of nodes for which the meter serves as a repeater.

The collector 116 then determines if it has the capacity to service the meter and any meters for which it operates as a repeater. If not, the collector 116 does not respond to the meter that is attempting to change collectors. If, however, the collector 116 determines that it has capacity to service the meter 114, the collector 116 stores registration information about the meter 114. The collector 116 then transmits a registration command to meter 114. The meter 114 updates its registration data to identify that it is now registered with the new collector. The collector 116 then communicates instructions to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. In one embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the unregistered command to propagate through the subnet, when a node receives the command it will not unregister immediately, but rather remain registered for a defined period, which may be referred to as the "Time to Live". During this time to live period, the nodes continue to respond to application layer and immediate retries allowing the unregistration command to propagate to all nodes in the subnet. Ultimately, the meters register with the replacement collector using the procedure described above.

One of collector's 116 main responsibilities within subnet 120 is to retrieve metering data from meters 114. In one embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. In greater detail, in one embodiment, the data collection process begins with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing continues. However, if all of the meters 114 in subnet 120 have been read, the collector waits a defined length of time, such as, for example, 4 hours, before attempting another read.

If during a read of a particular meter, the meter data is not received at collector 116, the collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

While the collection of data from one-way meters by the collector has been described above in the context of a network of two-way meters 114 that operate in the manner described in connection with the embodiments described above, it is understood that the present invention is not limited to the particular form of network established and utilized by the meters 114 to transmit data to the collector 116. Rather, the present invention may be used in the context of any network topology in which a plurality of two-way communication nodes are capable of transmitting data and of having that data propagated through the network of nodes to the collector 116.

As described above, the present invention provides techniques for over the air (OTA) microcontroller flash memory updates using a wireless network. The wireless network may comprise a control node 116, such as a collector, and a plurality of device nodes in wireless communication with the control node 116. Each of the device nodes may have a wireless communication path to the control node 116 that is either a direct path or an indirect path through one or more intermediate device nodes serving as relays.

Each of the device nodes includes a corresponding device that is capable of communicating with the control node 116 using the wireless network. Each of the device nodes are either "broadcast nodes" or "non-broadcast" nodes. The broadcast nodes are capable of receiving flood broadcast messages, while the non-broadcast nodes are not capable of receiving flood broadcast messages. As described above, a flood broadcast is a transmission from the control node 116 to each level one broadcast node, which is then relayed by the level one broadcast nodes to the level two nodes. This process is repeated at each level of the wireless network until each broadcast node has received the transmission.

The broadcast nodes typically include line-powered devices such as electricity meters and other communications devices which are permanently active to transmit and receive communications to and from the control node 116. By contrast, the non-broadcast nodes typically include battery-powered devices such as water and gas meters and premises devices such as in-home displays, thermostats, and load control devices. These battery powered devices are typically not capable of receiving flood broadcast messages because they may employ a sleep/wake cycle to preserve their battery power. During the sleep state, the battery powered devices are not active to communicate with other nodes, and would, therefore, be incapable of receiving or relaying the flood broadcast message. Although gas and water meters and premises devices are typically battery powered, they may also be line powered and therefore a "broadcast node."

Figure 5:
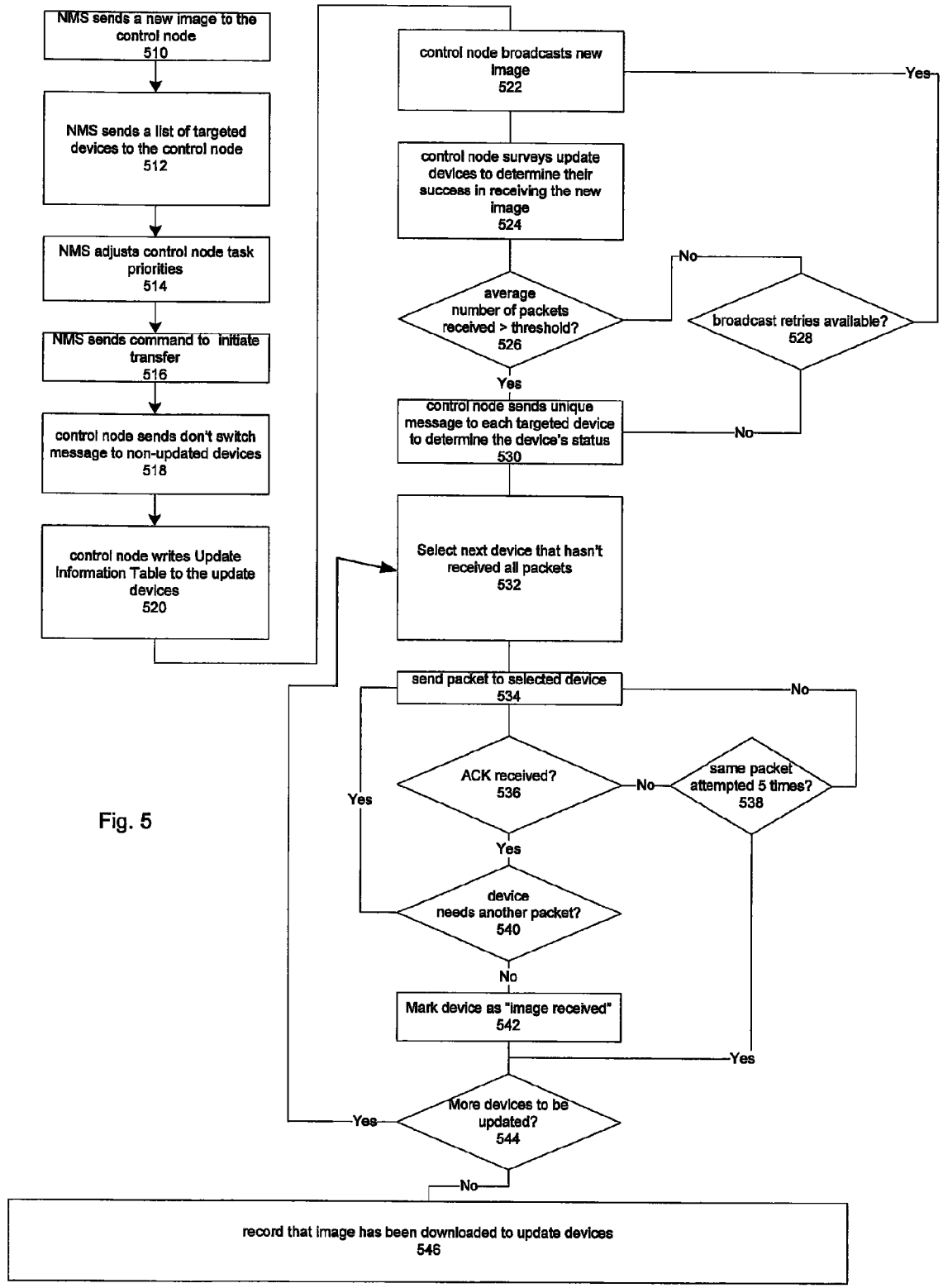
FIG. 5 is a flowchart of an exemplary method for transmitting over the air microcontroller updates to broadcast devices.

A flowchart of an exemplary method for transmitting over the air (OTA) microcontroller updates to broadcast devices is shown in FIG. 5. At act 510, network management server (NMS) 202 sends a new image to a control node 116. The term "image," as used herein, refers to microcontroller code that controls the operation of one or more electronic devices. Although the method of FIG. 5 is described with reference to updating of devices registered to only a single control node 116, it should be appreciated that NMS 202 may send commands to multiple control nodes to update any one or more of their registered devices simultaneously or at different times. At act 512, NMS 202 sends to the control node 116 a list of devices that are targeted to receive the new image. The list of targeted devices may, for example, include all devices registered to the control node 116 or all of one or more types of device devices registered to the control node 116 (e.g., all electricity meters, all gas meters, etc.). The list of targeted devices may also identify individual devices based on, for example, each individual device's local area network identifier (LAN ID).

After receiving the list of targeted devices from the NMS 202, the control node 116 will prepare for transmission of the new image. It should be noted here that, in addition to the devices specifically targeted by NMS 202 for updating, control node 116 will also send the updated image to non-targeted broadcast devices that are part of a targeted device's assigned communications path to the control node 116. As described above, control node 116 has access to information regarding the assigned communication path of each of its registered devices. The targeted broadcast devices, along with the non-targeted broadcast devices that are in the communication path of a targeted broadcast device, will be collectively referred to herein as "update" devices.

At act 514, NMS 202 sets (or resets) the scheduled tasks and/or task priorities of control node 116 to accommodate the image update. It may be desirable to designate the image update as a lowest priority task, thereby enabling the control node to complete its other scheduled tasks before performing the OTA update. It may also be desirable to disable certain scheduled tasks while the OTA update is being performed. For example, it may be desirable to continue meter reading, but disable all other functions while the OTA update is in progress. As another example, it may be desirable to change the meter reading schedule from once every four hours to once a day while the OTA update is in progress.

At act 516, NMS 202 sends a command to control node 116 to begin distribution of the image. At act 518, control node 116 sends a "don't switch" command to its registered devices that are not update devices. The "don't switch" command instructs these non-update devices to remain registered to the same control node 116 while the OTA updates are being performed. The "don't switch" command may set a designated "don't switch" bit in each of the non-targeted registered devices. The "don't switch" command may also increase the broken path time to prevent non-update devices from attempting to switch control nodes during the OTA update. The broken path time is a configurable parameter that sets a maximum time that a node stays registered to a control node before unregistering and attempting to find a new communication path either to the same control node or to a different control node.

At act 520, control node 116 sends a "Write Update Information" message to each of the update devices. The "Write Update Information" message may be sent separately to each update device on a one-by-one basis. The Write Update Information message may cause each update device to set its don't switch bit and increase its broken path time, thereby also preventing the update devices from switching control nodes while the OTA update is being performed. The Write Update Information message may also cause each update device to erase the storage area of its flash memory. The Write Update Information message may also include an identification of the image update that is about to be sent (an "image ID"). Each update device may include a number of image status registers that track, for example, the total number of image packets that the device has received and an identification of the first image packet that the device has not yet received. The Write Update Information message may cause each update device to reset its image status registers. Upon receiving the Write Update Information message, each update device may send a Write Update Information message response back to the control node 116 to acknowledge receipt of the Write Update Information message.

To isolate transmission failures and to minimize the amount of packets that need to be re-sent in the case of image corruption, the updated image may be divided into a number of chunks. The Write Update Information message may include information that enables cyclical redundancy checking (CRC), or any other suitable type of error checking, to be performed on each transmitted image chunk. For example, the Write Update Information message may include a chunk CRC table that provides a valid CRC value for each chunk of image data. Each CRC value may then be used to verify whether its corresponding chunk of the image has been received by an update device.

The Write Update Information message may also include other information about the layout and structure of the image update. For example, the Write Update Information message may identify a number of memory pages per chunk. The Write Update Information message may also include, for example, a page map having a bit corresponding to each memory page to indicate whether the memory page should be overwritten for the new image. For each bit that is set in the page map, the corresponding memory page of the operational image will be erased and updated with data from the new image.

At act 522, control node 116 broadcasts the new image to each update device using a "flood broadcast" message. As described above, the flood broadcast originates at control node 116 and propagates to each update device one level at a time. For example, control node 116 may transmit a flood broadcast to all first level update devices. The first level update devices that receive the message pick a random time slot and retransmit the broadcast message to second level update devices. Similarly, the second level update devices that receive the broadcast message pick a random time slot and communicate the broadcast message to third level update devices. This process continues out until all of the update devices are reached.

The control node 116 may broadcast the new image one packet at a time. Each packet of the transmitted image may include the image ID of the transmitted image. Upon receiving each packet of the transmitted image, each update device may verify that the image ID of the received packet matches the image ID in the Write Update Information message. If the image ID's do not match, then the update device may refuse to write the received packet to its flash memory. If the image ID's match, then the update device will begin to write the received image packet into its flash storage area. Each update device may maintain an "Update Status Table" that tracks the status of the image update. The update status table may include the image status registers described above, which may, for example, track the total number of image packets that the device has received and an identification of the first image packet that the device has not yet received.

Once all packets of a particular chunk of the new image are received by an update device, the device may calculate the CRC for the received chunk and verify the received CRC against the corresponding CRC in the CRC table of the Write Update Information message. If the CRC's do not match, then the device may erase its flash memory for that chunk of the image. The device may also adjust its status registers so that the packets for that chunk are marked as non-received. In addition to the status registers, the Update Status Table may also include, for example, a "Chunk CRC failure" bit, which may be set if a CRC failure is detected for any chunk of the new image. The particular chunk for which the failure was detected may also be recorded in another field.

At act 524, control node 116 surveys the update devices to determine their progress in receiving the new image. Control node 116 may survey all of the update devices or, alternatively, only a configurable percentage of the update devices. Control node 116 may survey the update devices by polling the devices to calculate an average number of packets received by the update devices. This information may be obtained from the Update Status Table of the surveyed update devices.

At act 526, control node 116 determines whether the average number of packets received by the surveyed update devices exceeds a pre-determined threshold level. If the average number of packets received by the surveyed targeted broadcast devices does not exceed the pre-determined threshold level, then, at act 528, control node 116 determines whether it has exceeded a configurable number of broadcast retries. If control node 116 has not exceeded the configurable number of broadcast retries, then control node 116 returns to act 522 and rebroadcasts the image to the update devices.

If either the average number of packets received by the surveyed targeted broadcast devices exceeds the pre-determined threshold level (act 526) or control node 116 has exceeded the configurable number of broadcast retries (act 528), then, at act 530, control node 116 may separately contact each update device, on a one-by-one basis, to determine the number of image packets received by each device. Then, for each targeted broadcast device which did not receive all of the transmitted image packets, control node 116 may, at acts 532-544, separately transmit the non-received image packets to each device on a one-by-one basis.

At act 532, control node 116 selects a next update device for which to complete transmission of non-received packets. At act 534, control node 116 determines a next packet that has not yet been received by the device and sends the next packet to the device. As described above, an identification of the next missing packet may be stored in the status registers of the Update Status Table at each device. At act 536, control node 116 determines whether it has received an acknowledgement from the device indicating that the packet has been received by the device within a threshold time period. If the acknowledgement is not received, then, at act 538, control node 116 determines whether it has exceeded a configurable number of transmission retries. If control node 116 has not exceeded the configurable number of transmission retries, then control node 116 returns to act 534 to retry the transmission. If, at act 536, the control node determines that is has received the transmission acknowledgement from the device, then, at act 540, control node 116 determines whether the device is still missing any of the image packets. If the device is still missing any of the image packets, then, the control node 116 returns to act 534 and sends the next non-received image packet to the device. If the device has received all of the image packets, then, at act 542, the control node records that the device has received all of the image packets. Once all of the image packets are received by the device (or the threshold number of transmission retries for the device is exceeded), control node 116 determines whether there are any remaining update devices that are still missing some of the image packets at act 544. If so, then the control node 116 returns to act 532 and selects a next device for which to complete transmission of non-received packets. For devices with which the threshold number of transmission retries was exceeded (act 538), control node 116 may wait until all other update devices have been fully updated, and then go back and retry the devices with exceeded thresholds at the very end of the process.

If all of the update devices have received all packets of the new image, then at act 546, the collector records that the download process to the update devices is complete. Once the new image has been successfully broadcast from the control node 116 to each of the update devices, control node 116 may send commands to the update devices to transfer the images to one or more targeted non-broadcast devices. These transfer commands need not be sent to all of the update devices. Rather these transfer commands need only be sent to update devices with a direct communications path to one or more targeted non-broadcast devices. As described above, control node 116 has access to information regarding the assigned communication path of each of its registered devices. Each update device with a direct communication path to one or more targeted non-broadcast devices will be referred to herein as a "transfer" device. Control node 116 may send a separate transfer command to each transfer device on a one-by-one basis.

Figure 6:
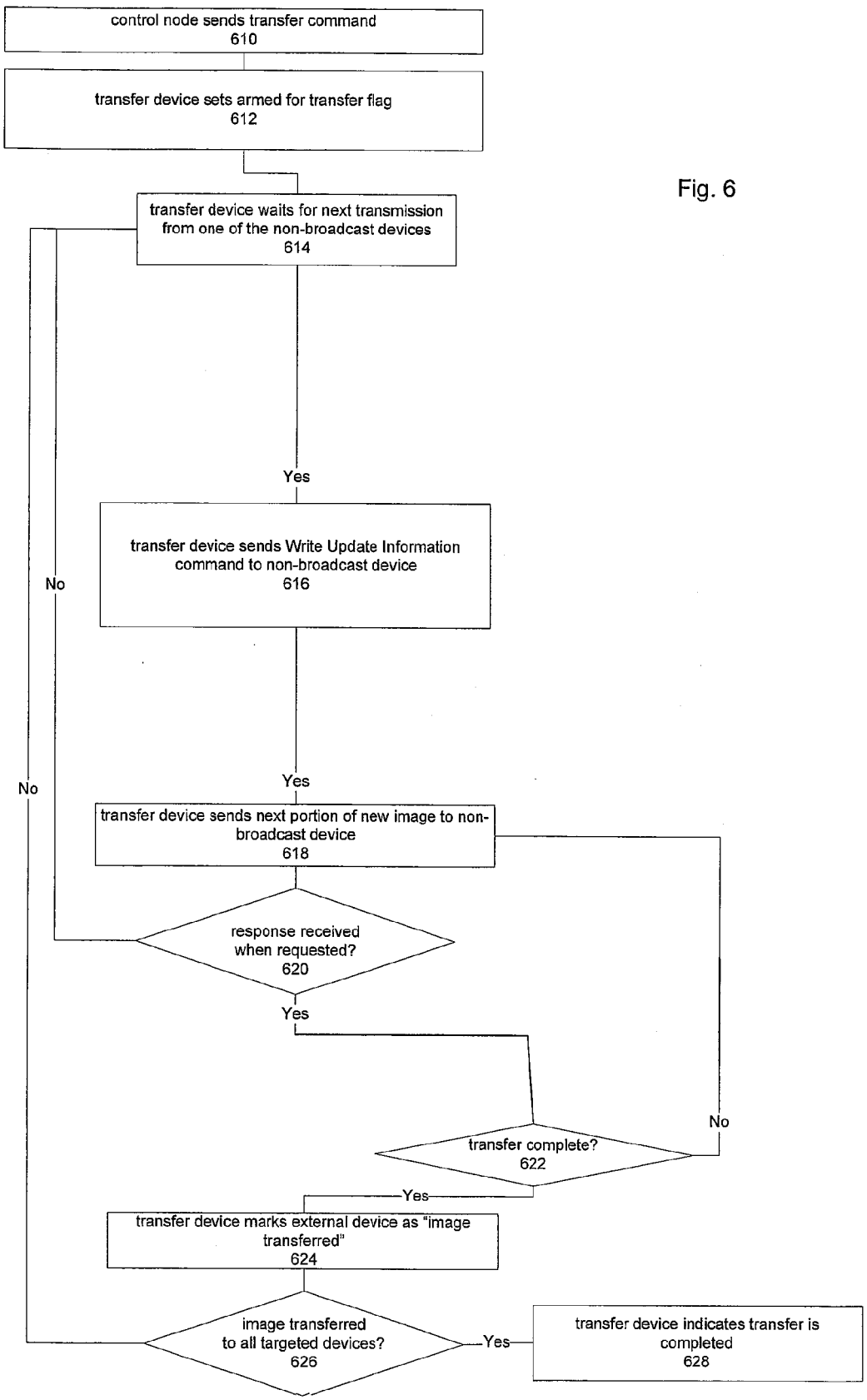
FIG. 6 is a flowchart of an exemplary method for transmitting over the air microcontroller updates to non-broadcast devices.

A flowchart of an exemplary method for transferring OTA microcontroller updates from a transfer device to one or more targeted non-broadcast devices is shown in FIG. 6. At act 610, the transfer device receives an image transfer command from the control node 116. The transfer command may identify the particular targeted non-broadcast devices to which the particular transfer device is to transfer the image. As described above, the transfer device will have a direct communication path to the particular targeted non-broadcast devices identified in the transfer command. The particular targeted non-broadcast devices may be identified based on, for example, their local area network identifiers (LAN ID). The transfer command may also include a date and time at which the image transfer is to be initiated. At act 612, the transfer device may set an "external update operation pending" flag, or use any other suitable technique, to indicate that the transfer device is in the process of transferring the image.

At act 614, the transfer device detects a first communication from one of the targeted non-broadcast devices after the date and time specified in the image transfer command. This communication indicates to the transfer device that the non-broadcast device from which the communication was received is in a wake state within its sleep/wake cycle and, therefore, is capable of receiving transmissions from the transfer device. At act 616, the transfer device transfers the Write Update Information message to the non-broadcast device. Upon receiving the Write Update Information message, the non-broadcast device may send a response to the transfer device to acknowledge receipt of the Write Update Information message from the transfer device. If no response is received within the appropriate time period, the transfer device may resend the Write Update Information package a configurable number of times. If no response is received after the configurable number of resends, then the method may return to act 614. Upon receiving the Write Update Information message, the non-broadcast device may also initiate a timeout period during which to stay awake and listen for the transmission of the new image from the transfer device.

At act 618, the transfer device begins to transfer the new image to the non-broadcast device. The new image may be transferred one packet at a time, and the transfer device may request confirmation of the transfer after a configurable increment of packets have been transmitted. For example, the transfer device may request confirmation from the non-broadcast device after every ten packets have been transmitted. This provides periodic confirmation that the non-broadcast device is awake and receiving packets. It may be necessary for the transfer device to send the new image packets more frequently than a certain minimum time interval in order to prevent the non-broadcast device from returning to sleep mode. It may also be necessary for the transfer device to send the new image packets less frequently than a certain maximum time interval in order to allow the non-broadcast device sufficient time to write the new data to its flash memory.

Similar to the broadcast devices, the non-broadcast devices may also, upon receiving each packet of the transmitted image, verify that the image ID of the received packet matches the image ID in the Write Update Information message. If the image ID's do not match, then the non-broadcast device may refuse to write the received packet to its flash memory. If the image ID's match, then the non-broadcast device will begin to write the received image packet into its flash storage area. Once all packets of a particular chunk of the new image are received by the non-broadcast device, the device may calculate the CRC for the received chunk and verify the received CRC against the corresponding CRC in the CRC table of the Write Update Information message. If the CRC's do not match, then the device may erase its flash memory for that chunk of the image. The device may also adjust its status registers so that the packets for that chunk are marked as non-received. The non-broadcast devices may include the Update Status Table, as described above, for tracking the status of the new image. Also similar to the broadcast devices, the non-broadcast devices may use the Update Status Table to track the number of received packets, first missing packet identification, CRC failure bits, and any other applicable information.

At act 620, after transmitting the configurable number of packets, the transfer device determines whether the confirmation has been received from the non-broadcast device within an appropriate time period. If no response is received within the appropriate time period, then the method may return to act 614. This process may be repeated a configurable number of times for each non-broadcast device. If the non-broadcast device's response indicates that there is a CRC verification error with a previously transmitted chunk, then the transfer device may consider its attempt to transfer the image to the particular non-broadcast device as a failure, and the method may return to act 614.

If, at act 620, the non-broadcast device confirms receipt of the transmitted packets, and there are no CRC errors, then, at act 622, the transfer device determines whether the image transfer is complete. If the image transfer is not complete, then the method returns to act 618, at which the transfer device transfers the next packet of the image. If the image transfer is complete, then, at act 624, the transfer device considers the image transfer to the non-broadcast device as complete. At act 626, the transfer device determines whether it has transferred the image to all of the targeted non-broadcast devices specified in the transfer command from the control node 116. If there is at least one targeted non-broadcast device that still needs to be updated, then the transfer device returns to act 614 to update the remaining device or devices. If all of the targeted non-broadcast devices have been updated, then, at act 628, the transfer device sets an "image transfer" bit in its Update Status Table to indicate that all of the targeted non-broadcast devices specified in the transfer command have been updated.

Throughout the image transfer process, the transfer device may maintain a Non-Broadcast Device Status Table that lists each targeted non-broadcast device and the corresponding status of the transfer to each device. For example, when receiving the transfer command, the transfer device may set a bit and/or generate an entry in the Non-Broadcast Device Status Table for each non-broadcast device to which the image is to be transferred. The entry may be marked as "in progress." Additionally, after completing the transfer to each of the targeted non-broadcast devices, the transfer device may mark the corresponding entry for the targeted non-broadcast device in the Non-Broadcast Device Status Table as "complete." Additionally, if the image transfer to any of the targeted non-broadcast devices fails, then the transfer device may mark the corresponding entry for the targeted non-broadcast device in the Non-Broadcast Device Status Table as "failure."

Throughout the process of downloading the new image to the targeted devices, the control node 116 may periodically poll any of the targeted devices to determine their progress with the update process. For example, the control node 116 may poll the Update Status Table and/or the Non-Broadcast Device Status Table of any of the target devices to determine whether the target device has received any or all of the image packets, whether it has transferred any or all of the image packets to one or more other devices, and whether there were any errors or failures during any part of the process. Once the control node 116 obtains this information from the targeted devices, the control node 116 may update its own records to reflect this information. The control node 116 may, in turn, be polled by the NMS 202 at any time to determine the status of the update process. Additionally, the control node 116 may send status reports to NMS 202 at key points in the update process such as, for example, after receiving the new update image, after the image has been successfully downloaded to targeted broadcast devices (or when commanded by NMS 202 to stop downloading the image), after the image has been successfully transferred to targeted non-broadcast devices (or when commanded by NMS 202 to stop transferring the image), and after the targeted devices have performed the actual update. Additionally, the NMS 202 may, at any time, send a command to control node 116 to stop and/or restart all or any portion of the update process. The control node 116 will then provide appropriate instructions to the appropriate devices that are affected by the stop/restart command.

Once the control node 116 has determined that the targeted devices have received the OTA flash update, the control node 116 may report this successful update to the NMS 202. Alternatively, NMS 202 may poll the control node to obtain this information. Once NMS 202 has been notified of the successful update, NMS 202 may send a command to control node 116 to commit the new image at the targeted devices. NMS 202 may request that the new image be committed immediately or at a future specified time.

After receiving the commit command from the NMS 202, the control node 116 will then send a commit command to each targeted device on a one-to-one basis. The commit command may include a total image CRC value for verifying the entire image. The commit command may also include an identification of each targeted device, such as, for example, a software specification identification (SSPEC) for the device.

If the commit command is ultimately targeted for a non-broadcast device, the commit command will be sent to a transfer device with a direct communication path to the targeted non-broadcast device. Upon receiving the commit command the transfer device may set an "external update operation pending" flag, or use any other suitable technique, to indicate that the transfer device is in the process of instructing a targeted non-broadcast device to commit the image. This is similar to the procedure described above at act 612 of FIG. 6 for transferring the new image to the targeted non-broadcast devices. The transfer device may then wait for a next transmission form the targeted non-broadcast device, and forward the commit command to the non-broadcast device after receiving the transmission from the non-broadcast device. This is similar to the procedure described above at acts 614-618 of FIG. 6 for transferring the new image to the targeted non-broadcast devices.

Upon receiving the commit command, each targeted device may compare the SSPEC value in the commit command with its own SSPEC value. If the SSPEC values do not match, the targeted device may abort the update process and set an "SSPEC mismatch" bit in its Update Status Table, or employ any other appropriate technique, to indicate the SSPEC mismatch (or a mismatch for any other suitable device identifier). Additionally, upon receiving the commit command, each targeted device may compare the total image CRC value sent in the commit command with the device's calculated total CRC value for the received new image. If the CRC values do not match, then the device may set an "Image CRC Mismatch" bit in its Update Status Table, or employ any other appropriate technique, to indicate the mismatch. Either of these or other verification techniques may be repeated a configurable number of times to ensure that the outcome of the calculations are correct before determining that a mismatch has occurred. Furthermore, upon receiving the commit command and performing each necessary verification, each targeted device may mark an "armed for commit" bit in its Update Status Table to indicate that it is ready to commit the image at a date and time specified in the commit command. When the specified date and time are reached, the device may then begin the commit process and mark a "committing image" bit in the Update Status Table. After successfully committing the image, the device may mark a "device update complete" bit in the Update Status Table.

As described above with respect to the image transfer process, each transfer device may maintain a Non-Broadcast Device Status Table to record the transfer status of each non-broadcast device. The Non-Broadcast Device Status Table may also be used during the commit process to record the commit status of each non-broadcast device. For example, when receiving the commit command, the transfer device may set a bit and/or generate an entry in the Non-Broadcast Device Status Table for each non-broadcast device to which the commit image command is targeted. The entry may be marked as "in progress." The transfer device may then poll the non-broadcast device throughout the commit process by, for example, reading the Update Status Table of the non-broadcast device. After receiving confirmation from the non-broadcast device that the image has been completed, the transfer device may mark the corresponding entry for the targeted non-broadcast device in the Non-Broadcast Device Status Table as "complete." Additionally, if any of the targeted non-broadcast devices fails to commit the image, then the transfer device may mark the corresponding entry for the targeted non-broadcast device in the Non-Broadcast Device Status Table as "failure." Once a transfer device has read a "device update complete" bit in the Update Status Table of a targeted non-broadcast device, the transfer device may read firmware revision information from the non-broadcast device. This firmware revision information may be stored in the appropriate entry of the Non-Broadcast Device Status Table.

Control node 116 may poll any of the broadcast devices at any time throughout the commit process to determine the commit status of each targeted device by, for example, reading the Update Status Table and/or Non-Broadcast Device Status Table at the broadcast devices. Control node 116 may store this status information, report this status information to NMS 202 and/or be polled by NMS 202 for this status information. After receiving this status information, NMS 202 may update its records to reflect the status information including, for example, the firmware version information for each device. NMS 202 may generate a variety of reports based on this status information, such as, for example, an exception report to indicate which, if any, devices failed to update.

Figure 7:
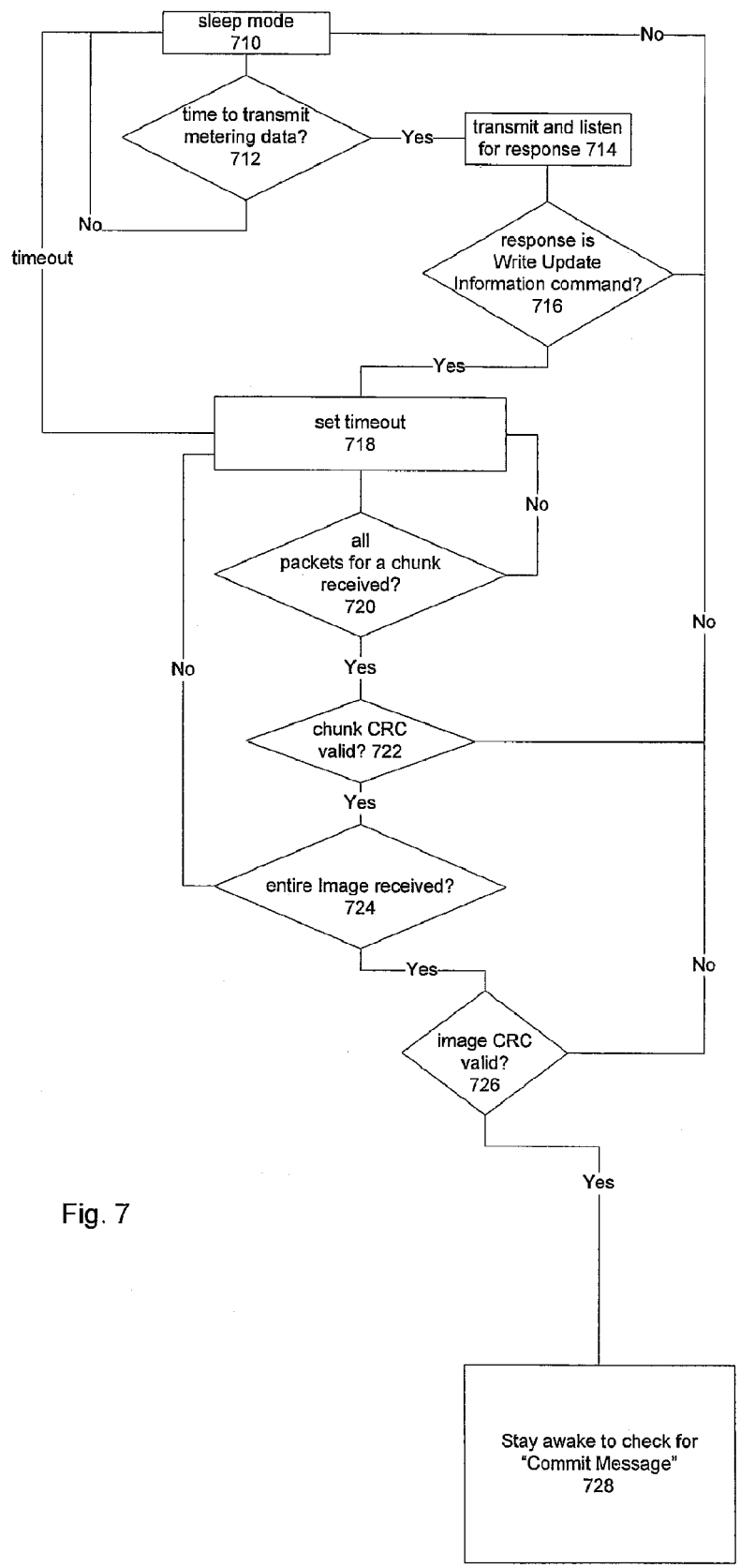
FIG. 7 is a flowchart of an exemplary method for receiving an over the air update a non-broadcast meter.

As set forth above, the non-broadcast devices are typically battery powered devices such as gas or water meters that employ a sleep/wake cycle to preserve device power. A flowchart of an exemplary method for receiving an OTA update at a non-broadcast meter is shown in FIG. 7. At act 710 the meter is in a sleep mode. At act 712, if it is not yet time to transmit meter data, then the meter remains in the sleepmode. If it is time to transmit meter data, then, at act 714, the meter transmits meter data and listens for a response from a transfer device. At act 716, if the response is not a Write Update command, then the meter returns to sleep mode. If the response is a Write Update Command, then, at act 718, the meter sets a timeout and waits to receive image packets from the transfer device. If no response is received prior to expiration of the timeout, then the meter returns to sleep mode. At act 720, if not all of the packets of a chuck are received from the transfer device, then the meter returns to act 718. If all packets of a chunk are received, then, at act 722, the meter determines whether the chunk CRC is valid by comparing the received CRC against the corresponding CRC in the Write Update Information Command. If the chunk CRC is valid, then, at act 724, the meter determines whether the entire image is received. If the entire image is not yet received, then the meter returns to act 718. If the entire image is received, then, at act 726, the meter determines whether the image CRC is valid. If the image CRC is not valid, then the meter returns to sleep mode. If the image CRC is valid, then, at act 728, the meter remains awake to listen for a commit command. The command need not necessarily be received immediately. For example, if the commit command is not received within a timeout period, then the meter may return to sleep mode. A commit command may then be received during a subsequent session.

As described above, the communication between a broadcast node and a non-broadcast node will be on a one-to-one basis. To reduce the total communication time, the two devices can synchronize to the frequency hopping sequence of the transmitting device. In normal operation, a longer preamble is used to allow the receiving device to reacquire the message each time the transmitter sends a packet. After receiving and acknowledging the first packet, the receiving device can synchronize to the channel order used by the transmitting device, and the acknowledgement from the receiving device can signal the transmitting device to use a shorter preamble, thereby significantly reducing the per-packet communication time. The transmitting device may have a configuration parameter to control the number of times each packet is transmitted. The receiving device may be able to discard duplicate packets. With two synchronized devices, each packet may be transmitted multiple times (to increase the overall link reliability) while maintaining the same overall communication time.

The speed of normal communications in the LAN are typically constrained by the device with the lowest speed of communications. For flash upgrades to a non-broadcast device, both the sending device (e.g., the broadcast device) and the receiving device (e.g., the non-broadcast device) may be capable of advanced communication options. In addition to synchronizing to the hop sequence, the two devices may use a faster data rate for transferring data. After receiving the acknowledgement at the normal communication rate, the sending device could notify the receiving device that future packets will be sent at a faster data rate. This ability can be used separately or in conjunction with the option of synchronizing to the frequency hopping sequence of the transmitting device.

An electronic device typically has various types of memory used for various purposes. ROM or flash memory is typically used to hold the microcontroller code. Non-volatile memory, such as EEPROM, is typically used to hold configuration parameters. Data is often times held in RAM, and the RAM may be saved to non-volatile memory when a power failure occurs (when power is removed from the RAM device). In an ideal scenario, the microcontroller code in flash memory can be upgraded without having to modify the program configuration parameters (typically in EEPROM) or without loss of data. However, changes to the microcontroller code cannot always be done in a manner to prevent changes to the configuration parameters or data structures, and mechanisms are provided to account for these conditions.

In a preferred embodiment, the new microcontroller code may be written with an understanding of the old version of the code, specifically the memory maps of the old version or versions of code from which the device(s) are being changed. It should be noted here that one set of upgrade information (new code and configuration changes) can be targeted to multiple devices, where the devices may be at different levels of "old" firmware. With knowledge of the old and new memory maps, the new image can have microcontroller code that is executed the first time the device starts up using the new image. On this startup condition, the code copies configuration parameters from the old memory locations to the new memory locations, and inserts a known value into fields that are in the new microcontroller code but did not exist in the old microcontroller code. The new microcontroller code can perform the same operations on data to ensure the data is retained across the upgrade. This mechanism controlled by the new firmware can be a stand-alone action that accounts for the memory changes. It can also be used in conjunction with table reads and writes that are performed by the system either prior to or after the upgrade.

An alternate means of maintaining the configuration parameters across the upgrade is to use a programming log in the device to be upgraded. This programming log allows the tables and data in the tables to be specified, and multiple table operations can be performed to properly configure the unit. The programming log table would hold this list of table write commands, where a table write can be one of table data (e.g., configuration data) or one of a function execution. The programming log table would preferably be located in non-volatile memory in a location that is fixed for all firmware releases. Alternatively, the programming log could be written to the device after the device commits to the new firmware, but, in this case, a minimal set of configuration parameters must be maintained to ensure the device is operational and able to receive the table writes required to set the programming log information. The programming log would be used during a microcontroller code (firmware) upgrade as follows:

1. New image is downloaded to the device (as previously described)
2. Programming log table is written
3. Device is told to commit to the new image and to reconfigure using the programming log
4. Device copies the new microcontroller code to the operational area (program area)
5. Device performs the actions listed in the programming log and verifies the validity of the configuration tables
6. Programming log is marked to indicate a successful program operation.

After the device is told to commit to the image, acts 4-6 may be performed until the operation is successful. A power failure or other interruption that occurs in the middle of these steps may cause the device to restart the process. This may ensure that the change of microcontroller code and the re-configuration of the device are finished and verified.

A programming log may consist of multiple table entries. The log may also specify a size and description for each of the table entries. Each entry may include information to define an action to be taken by the device. These actions may include, for example, table writes, where a table write can also be a function execution, or any other suitable types of commands or actions. An exemplary entry in the log is shown below.

| Field Name | Field Size (bytes) | Field Description |
|---|---|---|
| Table ID | 2 | |
| Table Offset | 3 | |
| Table Length | 2 | |
| Table Data | 2 | |
| Table CRC | 2 | |

Multiple log entries may be combined to form a programming log. An exemplary programming log is shown below.

| Field Name | Field Size (bytes) |
|---|---|
| Number of Enties | 2 |
| Entry #1 | Variable |
| Entry #2 | Variable |
| . | . |
| . | . |
| . | . |
| Entry N | Variable |

The use of a programming log to re-configure a device is not limited to being used only in conjunction with a firmware upgrade. For example, the programming log can also be used as a stand-alone mechanism to reconfigure a meter, and provides value in that multiple tables and/or actions can be forced to occur as part of the same "session." That is, all the actions are performed together because the targeted device only takes action after the entire program sequence is written to the log, and the contents of the log are verified.

In the same manner that firmware can be reverted to an old image, a backup program log can be used to revert to a previous configuration. The backup log may be used in conjunction with the programming log as follows:
1. Programming log is written
2. Device is instructed to execute the steps in the programming log
3. Prior to executing the steps, the table actions (both table writes and function executions, for example) are copied to the backup log, except the table data written to the backup log includes the table data currently resident in the device. In this manner, the device stores the old configuration.
4. Device executes the programming log
5. At a later point in time, the device can receive a command instructing it to revert to the old configuration. This could be in conjunction with a command instructing it to revert to a previous version of microcontroller code. The device uses the backup log, and processes the backup log in the same manner used to process the programming log.

The backup log and the programming log may be combined into the same physical memory. This may be performed by using a flag to indicate whether the action has been performed or is yet to be performed. This may also require a smaller temporary memory area in the event that the old information is larger than the new information. If the memory area is shared, the programming and backup log functions may be performed as follows:
1. Programming log is written
2. Device is instructed to execute the steps in the programming log
3. Device starts with the first programming log entry. If the action is a table write, the device copies the old data to a temporary location, writes the new data, then copies the old data to the programming log. If the old data size is greater than the new data size, the old data may be held in the temporary location until room is available in the programming log to hold the old data (the next entry in the programming log is executed successfully)
4. The entries in the programming log are marked as completed to ensure the old data is not copied over the new data in the event that the process is interrupted before the entire programming log is successfully executed.
5. At a later point in time, the device can receive a command instructing it to revert to the old configuration. The device processes the programming log in the same manner, allowing it to change between an old and a new configuration.

As described above, the NMS 202 may poll the control node 116 for status and/or command the collector stop the current operation at any point in the update process. The NMS 202 may also choose to stop the process at a given point in time. For example, if attempting to transfer the image to electricity meters, the NMS 202 may periodically poll the control node 116 to determine the progress. If all meters do not receive the message with a user determined period of time, the NMS 202 may allow the download process to be stopped, and may move forward with committing the image to the devices that have received the message. After this commit is successfully executed to the meters that have received the message, the NMS 202 may return and continue to download the image to devices that had not yet received the entire image. This process can be continued from where it was left off. The devices may continue to hold the packets of the image that were previously received until a new image transfer is initiated.

In the preferred embodiment, meters are prevented from switching to a different control node 116 during the upgrade sequence. However, there is nothing that prevents the system from operating in a manner where devices are allowed to switch control node 116s while an upgrade sequence is in process. Each switching device may retain the information they have received from the old control node 116 and can either pick up in the middle of the new control node 116 process or a new download event can be initiated on the new control node 116. In either case, the device that moved to a new control node 116 can report its status and only require a download of the missing portion of the image.

If the meters are instructed to remain with their control node 116 during the process, the NMS 202 may stop the control node process at some point in time if the download is not successful to all of the targeted devices. In this instance, the NMS 202 may re-enable the devices to find a different communication path, either to the same control node 116 or to a different control node 116. Devices that have received the image can be instructed to commit to the image. If they are not instructed to commit to the image, they may maintain the image until a new image download is initiated or until the NMS 202 instructs them to commit to the image. This allows system communication reconfigurations to occur, possibly improving the percentage of targeted devices which have received the image, prior to the point in time where devices are told to commit to the image. As described previously, when a commit is desired, devices may be instructed to commit immediately or commit at a specific date and time. The specific date and time may allow all devices in the system to switch to the new microcontroller code at the same instant in time.

NMS 202 may maintain the firmware version information for each device in the network. This data may be updated appropriately after a successful OTA update. The NMS 202 may generate exception reports for any devices that failed to update. NMS 202 may be informed (via some external process) when a device is updated via a mechanism (optical port for example) other than an OTA update.

As described above with reference to FIG. 4, block diagram illustrating an exemplary electricity meter flash microcontroller structure may include two microcontrollers, a main microcontroller 410 and a radio microcontroller 420, that communicate with each other through a serial interface (SPI bus). The main microcontroller 410 may have a flash memory divided into a program area 411, a new image holding area 412, and a bootloader 413. The program area 411 may hold the microcontroller code that is being run to control the operation of the main microcontroller 410. The new image holding 412 area may used to hold new code for one of the following:
- the main microcontroller 410 (to be loaded to the main micro program area 411)
- the radio microcontroller 420 (to be transferred to the radio microcontroller 420 via the SPI bus, after the complete new image is received and verified)
- A non-broadcast device, such as a gas or water meter, an in-home display, thermostat or load control device.

The bootloader area 413 may hold the microcontroller code that is run when a new flash image is to be transferred from the new image holding area 412 to the program area 411. The radio microcontroller 420 also includes a program area 421 and a bootloader 422.

After receiving a commit command, if the update image is targeted for an electricity meter host controller, the meter may perform the following steps:
1. Verify the SSPEC contained in the commit command
2. Perform CRC verification of the update image using the CRC value passed in the commit command
3. Stop all metering functions
4. Save all pertinent data
5. Write the new image (or pages) to the operation image portion of the flash memory.
6. Set status to indicate success or failure of the update.
7. Resume normal operation with new image The exemplary electricity meter radio controller described above has no nonvolatile data storage. Thus, when the radio controller is targeted for an OTA update, the new image may be stored in the storage flash area of the host controller. When the host controller receives the commit command targeted for the local radio controller, the following steps may be performed:
8. The host controller performs CRC verification of the update image using the CRC value passed in the commit command
9. The host controller issues an "enter bootloader" command which tells the radio controller to stop regular operation and transfer execution to the bootloader.
10. The enter bootloader command contains the SSPEC of the device to be updated. If this SSPEC does not match the radio controller's SSPEC, the radio controller continues normal operation and responds to the command with a response code. The host controller sets an "SSPEC Mismatch" error flag in the Update Status Table and aborts the update.
11. The host controller issues a "flash erase" command for the page(s) of data to be updated.
12. The host controller downloads the appropriate page(s) of image data to the radio controller using table writes to the "flash write" table.
13. The host controller repeats the erase and write steps for each page of data specified in the page map.
14. The host controller issues a flash end command.
15. The radio controller resets and attempts to begin execution with the new firmware image.
16. The host controller attempts to read the firmware version information from the radio controller.
17. If the firmware version information is read successfully the host controller will mark the radio as successfully updated.
18. If the version information cannot be read, the meter will consider the update failed and start the process over again.

If there is an update failure, the radio controller may remain in the bootloader until the image is successfully updated. The host controller will retry the update operation indefinitely or until commanded to stop via the optical port. The host controller may continue to perform normal metering functions throughout this process. Although the exemplary electricity meter described above has a portion of flash memory to hold the new image prior to switching from the old image to the new image, those skilled in the art will recognize that other types of memory, such as EEPROM or static RAM, could be used to store the new image.

The exemplary electricity meter described above stores the new image in one half of the 128K flash memory and continues to run the old microcontroller code until the new image is received and verified, and the system (through the control node 116) instructs the device to switch to the new image. When switching to the new image, the device may use the following technique to preserve the old image. Since the device can hold a firmware image for multiple types of microcontrollers, the function instructing the device to "commit the new image" can instruct the device whether it is to store the old image. Storing the old image allows the microcontroller to be instructed to revert to this image in the event that there is a problem found with the new image and the work around is to revert to the old image until a corrected new image can be downloaded. If instructed to preserve the old image, the device may copy the old image from the flash program space to local RAM (or EEPROM), copy the new image flash area to the corresponding program flash area, and copy the old image from local RAM to the new image flash area, overwriting the new code that was just written to the program flash area.

The control node 116 may provide an activation date and time in its command for committing the image and/or for transferring the image to non-broadcast devices. A broadcast device, using the date and time from the network, waits until the activation date and time before performing the requested action. When the requested action is to transfer the image to non-broadcast devices, the broadcast device may begin the transfer on the first transmission (from each device) after the activation date and time.

If the broadcast meter does not have valid date and time data, it may wait until time and date are received from the network. Once time and date have been received, the broadcast device may compare the new time and date to the activation date and time specified in the command from the control node 116. If the activation date and time is in the past relative to the date and time received from the network, the broadcast device may perform the requested action immediately. If the new date and time are prior to the activation date and time, the broadcast device may wait for the activation date and time before performing the action.

When the requested action is to commit non-broadcast devices, the broadcast device may send the command (with the activation date and time requested by the control node 116) to each non-broadcast device on the next transmission.

The non-broadcast device may then handle the date and time in the same fashion as described above for the broadcast device.

Some system devices may use an EEPROM to store configuration tables and other information. The memory map of this EEPROM is typically statically allocated and as such, any change to this memory map between versions of firmware may require special handling during the update process. Care must be taken to ensure that existing tables stored in EEPROM do not move between firmware revisions. Several techniques may be employed to avoid this situation. For example, any new tables may be added at the end of the EEPROM memory map. Additionally, a format version may be added to the EEPROM structure. This format code and registered memory, that is, the memory that is saved from RAM to EEPROM when power is removed from the device, will never move within the EEPROM memory map. The format version can be used by firmware to determine a compatibility with the EEPROM memory map and/or update the EEPROM contents to a new format if possible. Furthermore, pad bytes may be added to all configuration tables as well as registered memory. Finally, an automated procedure may be developed to verify the EEPROM memory map during the build process.

After the control node 116 has broadcast all packets of the firmware image, devices in the network will have either received all packets, or will be missing one or more packets. It is likely that different devices will be missing different packets. As another mechanism to transfer the image to all targeted devices, the control node 116 can instruct a unique device, a group of devices, or all devices in the LAN, to request their missing packets from a peer device. If configured to allow for peer correction, after sending the last packet of the image, the control node 116 may allocate a period of time for peer correction and may send a message to instruct one or more devices to request specific packets from neighboring devices. If a device receives a command telling it to update via peer correction, the message may specify the total time available and the maximum number of packets allowed to be requested by the device.

If the device is missing packets, it may pick the lesser of the number of allowed packets (specified in the control node 116 message) or the number of packets missing and pick this number of random timeslots for transmitting a packet request message(s). In each of the selected timeslots, the device may broadcast a message requesting a packet. The message may specify one or more packets that are needed by the device. Any device receiving the request that has one of the requested packets may respond to the request by selecting one of a configurable number of timeslots following the receipt of the request. The number of timeslots to be used for responses is a configurable value, and may be controlled by the control node 116 specifying the number in the peer correction message sent to devices missing packets. This timeslot number may then be forwarded in the message sent by the device requesting a missing packet.

The control node 116 may specify a group of devices that are to perform peer correction. The control node 116 may select devices based on communication level, number of missing packets, or any other suitable standard. In an embodiment, the devices may first be selected based on whether they are missing packets, and secondly based on their communication level. The control node 116 may start with level one devices and work toward higher level devices.

The time required to download an entire firmware image may be large. The time required may be reduced by breaking the image into "chunks" where the number of chunks downloaded can be less than the entire image size. In this case, the remaining chunks from the old image are used in the new image. To reduce the number of packets, the control node 116 can specify the specific packets in each chunk that must be changed. In this case, the collector specifies the packets within the chunk that are new, and the other packets are copied from the old image and used to write the new chunk to flash memory. For example, in a chunk consisting of 26 packets, 24 packets may be the same as the old image. The other two packets are different and must be transferred to the meter. Flash memory can often be written one byte at a time, but is often times only erased in blocks (or chunks). In the preferred embodiment, the chunk size is equal to the size of the erase block. In the above example, the new image area would first be erased. The 24 packets from the old image would be copied to the new image area. The two new packets would be received from the control node 116 and written to the new image area. In this example, the air time required to write a chunk is reduced by over 90% (24/26).

There may be instances where new firmware is desired to be loaded to a device, but there are system constraints that prevent the firmware from being immediately applied. The ability to switch to a new image at a specific point in time addresses this issue and allows all devices in the system to switch to the new image simultaneously. As explained previously, this is handled when an image is downloaded—the commit time can be specified to occur at a point in the future. In addition, certain devices may be shipped from the factory with a new image pre-loaded to the new image storage area. This new image may be for the main microcontroller, the radio microcontroller, or a non-broadcast device. The device can be shipped with a commit time for when the new image is to be applied. For images targeting an internal (e.g., broadcast) microcontroller, if the device is installed (powered on) and this time has expired, the device may immediately commit the new image. If the image is for external (e.g., non-broadcast) devices, the image may be transferred to the non-broadcast devices as long as their device type matches the device type of the new image. The device may optionally hold internal and external images until instructed by the system to commit the image (internal) or transfer the image (external).

While systems and methods have been described and illustrated with reference to specific embodiments, those skilled in the art will recognize that modification and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network in which it is necessary to perform OTA microcontroller flash memory updates. Accordingly, reference should be made to the following claims as describing the scope of the present invention.

What is claimed:

1. A wireless network comprising:
   a control node;
   a plurality of device nodes in wireless communication with the control node, each of the device nodes having a wireless communication path to the control node that is either a direct path or an indirect path through one or more intermediate device nodes serving as relays, each device node having a corresponding device comprising an embedded microcontroller with a flash memory;
   wherein the device nodes comprise broadcast nodes that are configured to receive the microcontroller flash memory update via a broadcast transmission, and wherein the device nodes further comprise non-broadcast nodes that are not configured to receive the microcontroller flash memory update via a broadcast transmission, wherein the control node transmits a microcontroller flash memory update to the plurality of broadcast nodes over the wireless network, the microcontroller flash memory update being first transmitted from the control node to each broadcast node with a direct communication path to the control node, the microcontroller flash memory update being then relayed by one or more broadcast nodes to other broadcast nodes until the microcontroller flash memory update is transmitted to each broadcast node in the wireless network, and wherein the control node determines when all of the broadcast nodes have received the microcontroller flash memory update, and, based on this determination, the control node then sends a command to transmit the microcontroller flash memory update from one or more broadcast nodes to each non-broadcast node.

2. The wireless network of claim 1, wherein the microcontroller flash memory update comprises less than all packets of an entire image to be stored in a microcontroller flash memory.

3. The wireless network of claim 1, wherein the broadcast nodes are line powered devices.

4. The wireless network of claim 1, wherein the non-broadcast nodes are battery powered devices.

5. A method for microcontroller flash memory updating in a wireless network comprising a control node and a plurality of device nodes in wireless communication with the control node, each of the device nodes having a wireless communication path to the control node that is either a direct path or an indirect path through one or more intermediate device nodes serving as relays, each device node having a corresponding device comprising an embedded microcontroller with a flash memory, the device nodes comprising a plurality of broadcast nodes that are configured to receive broadcast communications from the control node, the device nodes further comprising one or more non-broadcast nodes that are not configured to receive broadcast communications from the control node, the method comprising:

transmitting using broadcast techniques a microcontroller flash memory update from the control node to the plurality of broadcast nodes over the wireless network, the microcontroller flash memory update being first broadcast from the control node to each device node with a direct communication path to the control node, the microcontroller flash memory update being then relayed by one or more broadcast nodes to other broadcast nodes until the microcontroller flash memory update is transmitted to each broadcast node in the wireless network; and determining when all the broadcast nodes have received the microcontroller flash memory update, and based on this determination, subsequently transmitting a separate command from the control node to a first broadcast node, the separate command comprising instructions to relay the microcontroller flash memory update using non-broadcast transmission techniques from the first broadcast node to a first non-broadcast node in direct communication with the first broadcast node.

6. The method of claim 5, wherein the microcontroller flash memory update comprises less than all packets of an entire image to be stored in a microcontroller flash memory.

7. The method of claim 5, wherein the broadcast nodes are line powered devices.

8. The method of claim 5, wherein the one or more non-broadcast nodes are battery powered devices.

9. The method of claim 5, further comprising surveying the broadcast nodes to determine whether an average number of packets of the microcontroller flash memory update received by the broadcast nodes.

10. The method of claim 9, further comprising determining whether the average number of number of packets received by the broadcast nodes exceeds a threshold value and, if not, then re-broadcasting the microcontroller flash memory update until the average number of number of packets received by the broadcast nodes exceeds a threshold value.

11. The method of claim 5, further comprising sending a unique message to each device node to determine if the device has received all packets of the microcontroller flash memory update.

12. The method of claim 11, further comprising transmitting missing packets to each device node to that did not receive all packets of the microcontroller flash memory update.

13. A method for microcontroller flash memory updating in a wireless network comprising a control node and a plurality of device nodes in wireless communication with the control node, each of the device nodes having a wireless communication path to the control node that is either a direct path or an indirect path through one or more intermediate device nodes serving as relays, each device node having a corresponding device comprising an embedded microcontroller with a flash memory, the device nodes comprising one or more broadcast nodes that are configured to receive broadcast communications from the control node, the device nodes further comprising one or more non-broadcast nodes that are not configured to receive broadcast communications from the control node, the method comprising:

receiving by a first broadcast node the microcontroller flash memory update transmitted using broadcast techniques;

after a determination is made that all the broadcast nodes have received the microcontroller flash memory update, receiving by the first broadcast node a command comprising instructions to relay using non-broadcast transmission techniques the microcontroller flash memory update from the first broadcast node to a first non-broadcast node in direct communication with the first broadcast node; and transmitting by the first broadcast node the microcontroller flash memory update to the first non-broadcast node.

14. The method of claim 13, wherein the microcontroller flash memory update comprises less than all packets of an entire image to be stored in a microcontroller flash memory.

15. The method of claim 13, wherein the one or more broadcast nodes are line powered devices.

16. The method of claim 13, wherein the one or more non-broadcast nodes are battery powered devices.

17. The method of claim 13, further comprising relaying by the first broadcast node the microcontroller flash memory update to one or more other broadcast nodes.

* * * * *